United States Patent
Su et al.

(10) Patent No.: US 12,512,477 B2
(45) Date of Patent: Dec. 30, 2025

(54) SOLVENT-FREE METHODS OF FORMING SOLID-STATE ELECTRODES HAVING POLYMERIC FIBER NETWORKS BY USING FIBRILLATION PROCESSING ADDITIVES AND SOLID-STATE ELECTRODES MADE THEREFROM

(71) Applicant: GM GLOBAL TECHNOLOGY OPERATIONS LLC, Detroit, MI (US)

(72) Inventors: Qili Su, Shanghai (CN); Zhe Li, Shanghai (CN); Yong Lu, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 567 days.

(21) Appl. No.: 17/981,128

(22) Filed: Nov. 4, 2022

(65) Prior Publication Data
US 2024/0079594 A1 Mar. 7, 2024

(30) Foreign Application Priority Data
Sep. 2, 2022 (CN) .......................... 202211075522.9

(51) Int. Cl.
*H01M 4/62* (2006.01)
*H01M 4/139* (2010.01)
(Continued)

(52) U.S. Cl.
CPC ........... *H01M 4/623* (2013.01); *H01M 4/139* (2013.01); *H01M 10/0525* (2013.01);
(Continued)

(58) Field of Classification Search
CPC .. H01M 4/623; H01M 4/139; H01M 10/0525; H01M 10/0562
(Continued)

(56) References Cited

U.S. PATENT DOCUMENTS 8,002,921 B2 8/2011 Gadkaree et al.
10,714,756 B2 7/2020 Dai et al.
(Continued)

FOREIGN PATENT DOCUMENTS

CN 117691048 A 3/2024
DE 102021110480 A1 2/2022
(Continued)

OTHER PUBLICATIONS

Lappan et al. The Estimation of the Molecular Weight of Polytetrafluoroethylene Based on the Heat of Crystallisation. Macromol. Mater. Eng. 2004, vol. 289, pp. 420-425. Retrieved from https://onlinelibrary.wiley.com/doi/full/10.1002/mame.200300379 (Year: 2004).*

(Continued)

*Primary Examiner* — James M Erwin
(74) *Attorney, Agent, or Firm* — Harness, Dickey & Pierce, P.L.C.

(57) ABSTRACT

In various aspects, the present disclosure provides solvent-free methods of making a solid-state electrode active layer for a solid-state electrode in an electrochemical cell that cycles lithium ions, by using a plurality of solid polymeric binder particles capable of fibrillation with porous fibrillation particles with a first shear force to at least partially fibrillate the solid polymeric binder particles to form a polymeric binder mixture. The disclosure also contemplates a current collector and a porous active layer disposed thereon. The porous active layer includes a fibrous polymeric network having a plurality of solid particles distributed therein. The solid particles may include electroactive material particles, solid-state electrolyte particles, and porous fibrillation particles.

19 Claims, 5 Drawing Sheets

(51) Int. Cl.
   *H01M 10/0525* (2010.01)
   *H01M 10/0562* (2010.01)
   *H01M 4/02* (2006.01)

(52) U.S. Cl.
   CPC .. *H01M 10/0562* (2013.01); *H01M 2004/021* (2013.01); *H01M 2004/028* (2013.01); *H01M 2300/0068* (2013.01)

(58) Field of Classification Search
   USPC .......................................................... 429/304
   See application file for complete search history.

(56) References Cited

U.S. PATENT DOCUMENTS

| | | | |
|---|---|---|---|
| 10,741,812 | B2 | 8/2020 | Luski et al. |
| 10,950,836 | B2 | 3/2021 | Xiao et al. |
| 11,121,375 | B2 | 9/2021 | Hou et al. |
| 11,145,922 | B2 | 10/2021 | Li et al. |
| 11,205,798 | B2 | 12/2021 | Li et al. |
| 11,217,826 | B2 | 1/2022 | Li et al. |
| 11,295,901 | B2 | 4/2022 | Hou et al. |
| 11,316,142 | B2 | 4/2022 | Jiang et al. |
| 11,374,257 | B2 | 6/2022 | Hou et al. |
| 11,404,714 | B2 | 8/2022 | Hou et al. |
| 11,539,071 | B2 | 12/2022 | Li et al. |
| 2015/0270072 | A1* | 9/2015 | Sonobe .................. H01G 11/34 252/182.1 |
| 2019/0190012 | A1 | 6/2019 | Wu et al. |
| 2020/0403267 | A1 | 12/2020 | Li et al. |
| 2021/0020929 | A1 | 1/2021 | Kong et al. |
| 2021/0036310 | A1 | 2/2021 | Hou et al. |
| 2021/0050596 | A1 | 2/2021 | Li et al. |
| 2021/0057776 | A1 | 2/2021 | Lu et al. |
| 2021/0109136 | A1 | 4/2021 | Hao |
| 2021/0111426 | A1 | 4/2021 | Li et al. |
| 2021/0135224 | A1 | 5/2021 | Hou et al. |
| 2021/0151761 | A1 | 5/2021 | Jimenez et al. |
| 2021/0408518 | A1 | 12/2021 | Wang et al. |
| 2022/0037642 | A1 | 2/2022 | Ellison et al. |
| 2022/0102756 | A1 | 3/2022 | Frieberg et al. |
| 2022/0123352 | A1 | 4/2022 | Li et al. |
| 2022/0140422 | A1 | 5/2022 | Chen et al. |
| 2022/0166031 | A1 | 5/2022 | Li et al. |
| 2022/0173370 | A1 | 6/2022 | Kong et al. |
| 2022/0173377 | A1 | 6/2022 | Kong et al. |
| 2022/0181598 | A1 | 6/2022 | Lu et al. |
| 2022/0181685 | A1 | 6/2022 | Li et al. |
| 2022/0238885 | A1 | 7/2022 | Koestner et al. |
| 2022/0263055 | A1 | 8/2022 | Hou et al. |
| 2022/0263129 | A1 | 8/2022 | Lu et al. |
| 2022/0294010 | A1* | 9/2022 | Isomichi .................. H01M 4/62 |
| 2022/0302526 | A1 | 9/2022 | Li et al. |
| 2022/0407079 | A1 | 12/2022 | Lu et al. |
| 2023/0015143 | A1 | 1/2023 | Su et al. |
| 2023/0024667 | A1 | 1/2023 | Li et al. |
| 2023/0025830 | A1 | 1/2023 | Su et al. |
| 2023/0046608 | A1 | 2/2023 | Su et al. |
| 2023/0155108 | A1 | 5/2023 | Jiang et al. |
| 2023/0231141 | A1 | 7/2023 | Kong et al. |
| 2023/0231182 | A1* | 7/2023 | Yamada .............. H01M 10/052 429/316 |
| 2023/0387381 | A1 | 11/2023 | Li et al. |

FOREIGN PATENT DOCUMENTS

| | | | |
|---|---|---|---|
| DE | 102021130557 A1 | 8/2022 | |
| DE | 102022130522 B3 | 3/2024 | |
| WO | WO-2022050252 A1 * | 3/2022 | .......... H01M 10/052 |

OTHER PUBLICATIONS

True Geometry. At what temperature does PTFE begin to soften and exhibit creep? Retrieved from https://blog.truegeometry.com/api/exploreHTML/18eae1c2add4f321f155d4a3fe460f79.exploreHTML (Year: 2025).*

First Office Action for German Patent Application No. 10 2022 130 522.8 issued on Jul. 26, 2023, with correspondence from Manitz Finsterwald Patent—und Rechtsanwaltspartnerschaft mbB summarizing Office Action; 4 pages.

Qili Su et al.; U.S. Appl. No. 17/710,900, filed Mar. 31, 2022, entitled "Gel Electrolyte System For Solid State Battery"; 76 pages.

Zhe Li et al.; U.S. Appl. No. 17/869,580, filed Jul. 20, 2022, entitled "Sulfide-Impregnated Columnar Silicon Anode For All-Solid-State Battery and Method of Forming The Same"; 49 pages.

Qi Lu et al.; U.S. Appl. No. 17/698,865, filed Mar. 18, 2022, entitled "Bipolar Current Collector and Method of Making the Same"; 48 pages.

Qili Su et al.; U.S. Appl. No. 17/697,135, filed Mar. 17, 2022, entitled "Methods of Manufacturing Bipolar solid-State Batteries"; 77 pages.

Qili Su et al.; U.S. Appl. No. 17/688,445, filed Mar. 7, 2022, entitled "Methods of Fabricating Bipolar Solid State Batteries"; 77 pages.

Zhe Li et al.; U.S. Appl. No. 17/707,524, filed Mar. 29, 2022, entitled "Argyrodite Solid Electrolytes for Solid-State Batteries and Methods of Making the Same"; 56 pages.

Dewen Kong et al.; U.S. Appl. No. 17/884,214, filed Aug. 9, 2022, titled "Electrodes Including Polymer Binder Networks With Bamboo-Type Fiber"; 59 pages.

Steven Renault et al.; "A Green Li-Organic Battery Working as a Fuel Cell in Case of Emergency"; Electronic Supplementary Material (ESI) for Energy & Environmental Science; The Royal Society of Chemistry; Jul. 2013; 6 pages.

Xiang Liu et al.; "Thermal Runaway of Lithium-Ion Batteries without Internal Short Circuit"; Joule 2; Oct. 17, 2018; pp. 2047-2064.

Hyung-Joo Noh et al.; "Comparison of the structural and electrochemical properties of layered Li[$Ni_xCo_yMn_z$]$O_2$ (x = 1/3, 0.5, 0.6, 0.7, 0.8 and 0.85) cathode material for lithium-ion batteries"; Journal of Power Sources 233; Jan. 19, 2013; pp. 121-130.

Nicola Michael Jobst et al.; "Ternary Cathode Blend Electrodes for Environmentally Friendly Lithium-Ion Batteries"; ChemSusChem 2020, 13; Wiley Online Library; pp. 3928-3936.

Meng Jiang et al.; U.S. Appl. No. 17/526,762, filed Nov. 15, 2021, entitled "Methods for Making Thick Multilayer Electrodes"; 52 pages.

* cited by examiner

SOLVENT-FREE METHODS OF FORMING SOLID-STATE ELECTRODES HAVING POLYMERIC FIBER NETWORKS BY USING FIBRILLATION PROCESSING ADDITIVES AND SOLID-STATE ELECTRODES MADE THEREFROM

CROSS-REFERENCE TO RELATED APPLICATIONS

This application claims the benefit of Chinese Patent Application No. 202211075522.9 filed on Sep. 2, 2022. The entire disclosure of the application referenced above is incorporated herein by reference.

INTRODUCTION

This section provides background information related to the present disclosure which is not necessarily prior art.

The present disclosure relates to solid-state lithium-ion electrochemical cells having electrodes including sulfide-based electrolyte particles, electroactive material particles, and high surface area activated carbon particles distributed in a fibrillary polymeric network and solvent-free methods for making the same.

High-energy density electrochemical cells, such as lithium-ion batteries can be used in a variety of consumer products and vehicles, such as hybrid or electric vehicles, including start-stop systems (e.g., 12V start-stop systems), battery-assisted systems ("μBAS"), Hybrid Electric Vehicles ("HEVs"), and Electric Vehicles ("EVs"). Typical lithium-ion batteries include cells each having a first electrode (e.g., a positive electrode or cathode) and a second electrode (e.g., a negative electrode or anode), an electrolyte in the form of a liquid, semi-solid/gel, or solid, and a microporous polymeric separator when a liquid electrolyte is present.

Solid-state batteries may include solid-state electrolyte particles in an interlayer between the cathode and anode that replaces the microporous polymeric separator imbibed with liquid electrolyte, as well as solid-state electrolyte particles potentially being mixed into the cathode and/anode when these are composite electrodes. Solid-state batteries have advantages over batteries that include a polymeric separator and a liquid electrolyte. These advantages can include high power capability, high abuse tolerance, and a longer shelf life with lower self-discharge, simpler thermal management, a reduced need for packaging, and the ability to operate within a wider temperature window. For example, solid-state electrolytes are generally non-volatile and non-flammable, so as to allow cells to be cycled under harsher conditions without experiencing diminished potential or thermal runaway, which can potentially occur with the use of liquid electrolytes. However, many formation techniques for solid-state batteries employ solvents, such as volatile organic compounds (VOCs). It would be desirable to develop high-performance solid-state battery electrodes formed via manufacturing processes that reduce or eliminate the use of solvents, like VOCs.

SUMMARY

This section provides a general summary of the disclosure, and is not a comprehensive disclosure of its full scope or all of its features.

The present disclosure relates to a solid-state electrode for an electrochemical cell that cycles lithium ions. In certain aspects, the solid-state electrode including a current collector and a porous active layer disposed on the current collector. The porous active layer includes a fibrous polymeric network having a plurality of solid particles distributed therein. The plurality of solid particles includes: electroactive material particles, solid-state electrolyte particles, and porous fibrillation particles. The fibrous polymeric network includes polymer fibers having an average diameter of greater than or equal to about greater than or equal to about 20 nanometers to less than or equal to about 300 nanometers.

In certain aspects, the polymer fibers include polytetrafluoroethylene (PTFE).

In certain further aspects, the polytetrafluoroethylene (PTFE) has an average molecular weight of greater than or equal to about $10^5$ to less than or equal to about $10^9$ g/mol and has a softening point of greater than or equal to about 270° C. to less than or equal to about 380° C.

In certain aspects, the solid-state electrolyte particles include a sulfide-based solid electrolyte and the electroactive material particles include a positive electroactive material selected from the group consisting of: a rock salt layered oxide, a spinel, a polyanion cathode, a lithium-transition metal oxide, a lithium borate, a lithium-silicon alloying compound, lithium-tin alloying compound, lithium metal, lithium alloy, lithiated metal oxide/sulfide, lithium sulfide, sulfur, and combinations thereof.

In certain aspects, the porous fibrillation particles are selected from the group consisting of: activated carbon, carbon xerogel, carbon aerogel, carbon nanotube, mesoporous carbon, templated carbon, carbide-derived carbon, graphene, porous carbon spheres, heteroatom-doped carbon, metal organic framework, zeolite, and combinations thereof.

In certain aspects, the porous fibrillation particles have an average specific surface area of greater than or equal to about 100 m$^2$/g, an average particle diameter of greater than or equal to about 0.5 micrometers to less than or equal to about 60 micrometers, and an average pore diameter of greater than or equal to about 5 nm to less than or equal to about 1 micrometer.

In certain aspects, the porous fibrillation particles include activated carbon and are present in the porous active layer at greater than or equal to about 0.01% by mass to less than or equal to about 10% by mass.

In certain aspects, the fibrous polymeric network is present in the porous active layer at greater than or equal to about 0.01% by mass to less than or equal to about 10% by mass.

In certain aspects, the solid-state electrode further includes a plurality of electrically conductive particles.

In certain aspects, the fibrous polymeric network is present in the porous active layer at greater than or equal to about 0.01% by mass to less than or equal to about 17% by mass, the porous fibrillation particles include activated carbon and are present in the porous active layer at greater than or equal to about 0.01% by mass to less than or equal to about 17% by mass, the electroactive material particles are present in the porous active layer at greater than or equal to about 5% by mass to less than or equal to about 98% by mass, the solid-state electrolyte particles are present in the porous active layer at greater than or equal to about 1% by mass to less than or equal to about 70% by mass, and the electrically conductive particles are present in the porous active layer at greater than 0% by mass to less than or equal to about 30% by mass.

The present disclosure further relates to a solvent-free method of making a solid-state electrode active layer for a solid-state electrode in an electrochemical cell that cycles lithium ions. The method includes first mixing a plurality of solid polymeric binder particles capable of fibrillation with porous fibrillation particles with a first shear force to at least partially fibrillate the solid polymeric binder particles to form a polymeric binder mixture. The method also includes admixing electroactive material particles and solid-state electrolyte particles to form a particle admixture. The polymeric binder mixture and the particle admixture are combined together and the method also includes conducting additional mixing with a second shear force to fully fibrillate the solid polymeric binder particles to form clusters of polymer fibers with a plurality of solid particles including the electroactive material particles, the solid-state electrolyte particles, and the porous fibrillation particles. Then, the clusters are consolidated under pressure to form a film including a fibrous polymeric network having the plurality of the plurality of solid particles distributed therein. The fibrous polymeric network includes the polymer fibers having an average diameter of greater than or equal to about 20 nanometers to less than or equal to about 300 nanometers.

In certain aspects, the plurality of solid polymeric binder particles are pre-treated to remove water to have a moisture content of less than or equal to about 500 ppm of water.

In certain aspects, the plurality of solid polymeric binder particles have an average particle diameter of greater than or equal to about 100 micrometers to less than or equal to about 800 micrometers, include polytetrafluoroethylene (PTFE) having an average molecular weight of greater than or equal to about $10^5$ to less than or equal to about $10^9$ g/mol and has a softening point of greater than or equal to about 270° C. to less than or equal to about 380° C.

In certain aspects, the consolidating occurs by rolling the clusters for a duration of greater than or equal to about 1 minute to less than or equal to about 360 minutes.

In certain aspects, the method further includes applying heat during the consolidating, wherein a temperature of the applying of the heat is greater than or equal to about 40° C. to less than or equal to about 100° C.

In certain aspects, the first mixing is conducted for greater than or equal to about 1 minute to less than or equal to about 120 minutes and the first mixing and the additional mixing are independently conducted at a speed of greater than or equal to about 400 rpm to less than or equal to about 5,000 rpm.

In certain aspects, the film has a thickness of greater than or equal to about 10 micrometers to less than or equal to about 1,000 micrometers.

In certain aspects, the film is a free-standing film and the method further includes disposing the free-standing film over a current collector to form the solid-state electrode active layer of the solid-state electrode.

In certain aspects, the porous fibrillation particles include activated carbon having an average specific surface area of greater than or equal to about 100 m²/g, an average particle diameter of greater than or equal to about 0.5 micrometers to less than or equal to about 60 micrometers, and an average pore diameter of greater than or equal to about 5 nm to less than or equal to about 1 micrometer.

The present disclosure also a solid-state electrochemical cell that cycles lithium ions. The solid-state electrochemical cell that includes a first solid-state electrode including a current collector and a porous active layer disposed on the current collector. The porous active layer includes a fibrous polymeric network having a plurality of solid particles distributed therein. The plurality of solid particles includes: electroactive material particles, solid-state electrolyte particles, and porous fibrillation particles. The fibrous polymeric network includes polymer fibers having an average diameter of greater than or equal to about greater than or equal to about 20 nanometers to less than or equal to about 300 nanometers. The solid-state electrochemical cell also includes a second solid-state electrode and a solid-state separating layer disposed between the first solid-state electrode and the second solid-state electrode. The solid-state electrochemical cell may be free of any liquids, such as liquid electrolyte.

In certain aspects, the porous fibrillation particles include activated carbon and the polymer fibers include polytetrafluoroethylene (PTFE).

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
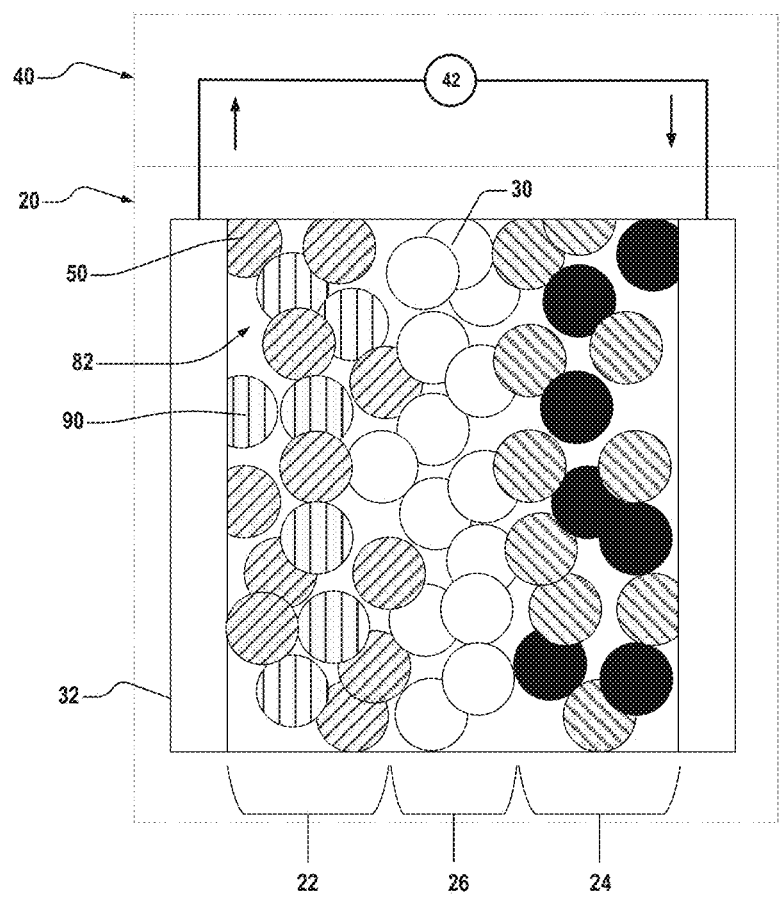
FIG. 1 is an illustration of an example solid-state battery.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The current technology pertains to solid-state electrodes for solid-state batteries (SSBs) and methods of forming and using the same. Solid-state batteries may include at least one solid component, for example, at least one solid electrode, but may also include semi-solid or gel, liquid, or gas components, in certain variations. Solid-state batteries may have a monopolar of bipolar stack design. The bipolar stacking design includes, for example, a plurality of bipolar electrodes where a first mixture of solid-state electroactive material particles (and optional solid-state electrolyte particles) is disposed on a first side of a current collector, and a second mixture of solid-state electroactive material particles (and optional solid-state electrolyte particles) is disposed on a second side of a current collector that is parallel with the first side. The first mixture may include, as the solid-state electroactive material particles, cathode material particles. The second mixture may include, as solid-state electroactive material particles, anode material particles. The solid-state electrolyte particles in each instance may be the same or different.

In other variations, all-solid-state batteries may have a monopolar stacking design. The monopolar stacking design includes, for example, a plurality of monopolar electrodes where a first mixture of solid-state electroactive material particles (and optional solid-state electrolyte particles) is disposed on both a first side and a second side of a first current collector, where the first and second sides of the first current collector are substantially parallel, and a second mixture of solid-state electroactive material particles (and optional solid-state electrolyte particles) is disposed on both a first side and a second side of a second current collector, where the first and second sides of the second current collector are substantially parallel. The first mixture may include, as the solid-state electroactive material particles, cathode material particles. The second mixture may include, as solid-state electroactive material particles, anode material particles. The solid-state electrolyte particles in each instance may be the same or different. In certain variations, solid-state batteries may include a mixture of combination of bipolar and monopolar stacking designs.

An exemplary and schematic illustration of a solid-state electrochemical cell unit (also referred to as a "solid-state battery" and/or "battery") 20 that cycles lithium ions is shown in FIG. 1. The battery 20 includes a negative electrode (e.g., anode) 22, a positive electrode (e.g., cathode) 24, and an electrolyte layer 26 that occupies a space defined between the two or more electrodes. The electrolyte layer 26 is a solid-state or semi-solid state separating layer that physically separates the negative electrode 22 from the positive electrode 24. The electrolyte layer 26 may include a first plurality of solid-state electrolyte particles 30. A second plurality of solid-state electrolyte particles 90 may be mixed with negative solid-state electroactive particles 50 in the negative electrode 22, and a third plurality of solid-state electrolyte particles 92 may be mixed with positive solid-state electroactive particles 60 in the positive electrode 24, so as to form a continuous electrolyte network, which may be a continuous lithium-ion conduction network.

A first current collector 32 may be positioned at or near the negative electrode 22. A second current collector 34 may be positioned at or near the positive electrode 24. The first and second current collectors 32, 34 may be the same or different. For example, the first and second current collectors 32, 34 may each have a thickness greater than or equal to about 2 μm to less than or equal to about 30 μm. The first and second current collectors 32, 34 may each be thin metal layers, such as metal foils, which an average thickness ranging from greater than or equal to about 2 micrometers to less than or equal to about 30 micrometers. The metals may include at least one of stainless steel, aluminum, nickel, iron, titanium, copper, tin, alloys thereof, or any other electrically conductive material known to those of skill in the art.

In certain variations, the first current collector 32 and/or the second current collector 34 may be a cladded foil, for example, where the current collector is a bipolar current collector and one side (e.g., the first side or the second side) of the current collector 32, 34 includes one metal (e.g., first metal) and another side (e.g., the other side of the first side or the second side) of the current collector includes another metal (e.g., second metal). The cladded foil may include, for example only, aluminum-copper (Al—Cu), nickel-copper (Ni—Cu), stainless steel-copper (SS—Cu), aluminum-nickel (Al—Ni), aluminum-stainless steel (Al—SS), and nickel-stainless steel (Ni—SS). In certain variations, the first current collector 32 and/or second current collectors 34 may be pre-coated, such as graphene or carbon-coated aluminum current collectors or may have a conductive adhesive coating, as described further below.

In each instance, the first current collector 32 and the second current collector 34 respectively collect and move free electrons to and from an external circuit 40 (as shown by the block arrows). For example, an interruptible external circuit 40 and a load device 42 may connect the negative electrode 22 (through the first current collector 32) and the positive electrode 24 (through the second current collector 34).

The battery 20 can generate an electric current (indicated by arrows in FIG. 1) during discharge by way of reversible electrochemical reactions that occur when the external circuit 40 is closed (to connect the negative electrode 22 and the positive electrode 24) and when the negative electrode 22 has a lower potential than the positive electrode 24. The chemical potential difference between the negative electrode 22 and the positive electrode 24 drives electrons produced by a reaction, for example, the oxidation of intercalated lithium, at the negative electrode 22, through the external circuit 40 toward the positive electrode 24. Lithium ions, which are also produced at the negative electrode 22, are concurrently transferred through the electrolyte layer 26 toward the positive electrode 24. The electrons flow through the external circuit 40 and the lithium ions migrate across the electrolyte layer 26 to the positive electrode 24, where they may be plated, reacted, or intercalated. The electric current passing through the external circuit 40 can be harnessed and directed through the load device 42 (in the direction of the arrows) until the lithium in the negative electrode 22 is depleted and the capacity of the battery 20 is diminished.

The battery 20 can be charged or reenergized at any time by connecting an external power source (e.g., charging device) to the battery 20 to reverse the electrochemical reactions that occur during battery discharge. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator. The connection of the external power source to the battery 20 promotes a reaction, for example, non-spontaneous oxidation of intercalated lithium, at the positive electrode 24 so that electrons and lithium ions are produced. The electrons, which flow back toward the negative electrode 22 through the external circuit 40, and the lithium ions, which move across the electrolyte layer 26 back toward the negative electrode 22, reunite at the negative electrode 22 and replenish it with lithium for consumption during the next battery discharge cycle. As such, a complete discharging event followed by a complete charging event is considered to be a cycle, where lithium ions are cycled between the positive electrode 24 and the negative electrode 22.

The individual electrochemical cell/battery 20 may have a thickness, measured from an outer surface of the negative electrode current collector 32 to an opposite outer surface of the positive electrode current collector 34 in the range of about 100 micrometers (μm) to about 1 mm. Individually, in certain variations, the current collectors 32, 34 may have thicknesses of about 20 μm, the electrode layers 22, 24 may have thicknesses of greater than about 5 μm up to 200 μm, and the separator electrolyte layer 26 may have a thickness of about 25 μm.

Although the illustrated example includes a single positive electrode 24 and a single negative electrode 22, the skilled artisan will recognize that the current teachings apply to various other configurations, including those having one or more cathodes and one or more anodes, as well as various current collectors and current collector films with electroactive particle layers disposed on or adjacent to or embedded within one or more surfaces thereof. Likewise, it should be recognized that the battery 20 may include a variety of other components that, while not depicted here, are nonetheless known to those of skill in the art. For example, the battery 20 may include a casing, a gasket, terminal caps, and any other conventional components or materials that may be situated within the battery 20, including between or around the negative electrode 22, the positive electrode 24, and/or the solid-state electrolyte 26 layer.

Each of the negative electrode current collector 32, the negative electrode 22, the electrolyte layer 26, the positive electrode 24, and the positive electrode current collector 34 may be prepared as relatively thin layers (for example, from several microns to a millimeter or less in thickness) and assembled in layers connected in series arrangement to provide a suitable electrical energy, battery voltage and power package, for example, to yield a Series-Connected Elementary Cell Core ("SECC"). In various other instances, the battery 20 may further include electrodes 22, 24 connected in parallel to provide suitable electrical energy, battery voltage, and power for example, to yield a Parallel-Connected Elementary Cell Core ("PECC").

The size and shape of the battery 20 may vary depending on the particular applications for which it is designed. Battery-powered vehicles and hand-held consumer electronic devices are two examples where the battery 20 would most likely be designed to different size, capacity, voltage, energy, and power-output specifications. The battery 20 may also be connected in series or parallel with other similar lithium-ion cells or batteries to produce a greater voltage output, energy, and power if it is required by the load device 42. The battery 20 can generate an electric current to the load device 42 that can be operatively connected to the external circuit 40. The load device 42 may be fully or partially powered by the electric current passing through the external circuit 40 when the battery 20 is discharging. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be an electricity-generating apparatus that charges the battery 20 for purposes of storing electrical energy.

Such solid-state batteries may be incorporated into energy storage devices, like rechargeable lithium-ion batteries, which may be used in automotive transportation applications (e.g., motorcycles, boats, tractors, buses, mobile homes, campers, and tanks). The present technology, however, may also be used in other electrochemical devices, including aerospace components, consumer goods, devices, buildings (e.g., houses, offices, sheds, and warehouses), office equipment and furniture, and industrial equipment machinery, agricultural or farm equipment, or heavy machinery, by way of non-limiting example.

With renewed reference to FIG. 1, the solid-state electrolyte layer 26 provides electrical separation—preventing physical contact—between the negative electrode 22 and the positive electrode 24. The solid-state electrolyte layer 26 also provides a minimal resistance path for internal passage of ions. In various aspects, the solid-state electrolyte layer 26 may be defined by a first plurality of solid-state electrolyte particles 30. For example, the solid-state electrolyte layer 26 may be in the form of a porous layer or a composite that comprises the first plurality of solid-state electrolyte particles 30. The solid-state electrolyte particles 30 may have an average particle diameter greater than or equal to about 0.02 µm to less than or equal to about 20 µm, optionally greater than or equal to about 0.1 µm to less than or equal to about 10 µm, and in certain aspects, optionally greater than or equal to about 0.1 µm to less than or equal to about 1 µm. The solid-state electrolyte layer 26 may be in the form of a layer having a thickness greater than or equal to about 5 µm to less than or equal to about 200 µm, optionally greater than or equal to about 10 µm to less than or equal to about 100 µm, optionally about 40 µm, and in certain aspects, optionally about 30 µm.

The solid-state electrolyte particles 30 may comprise one or more sulfide-based particles, oxide-based particles, metal-doped or aliovalent-substituted oxide particles, inactive oxide particles, nitride-based particles, hydride-based particles, halide-based particles, and borate-based particles. Other solid electrolytes that possess low grain-boundary resistance are also contemplated.

In certain variations, the oxide-based particles may comprise one or more garnet ceramics, LISICON-type oxides, NASICON-type oxides, and Perovskite type ceramics. For example, the garnet ceramics may be selected from the group consisting of: $Li_7La_3Zr_2O_{12}$, $Li_{6.2}Ga_{0.3}La_{2.98}Rb_{0.05}Zr_2O_{12}$, $Li_{6.85}La_{2.9}Ca_{0.1}Zr_{1.75}Nb_{0.25}O_{12}$, $Li_{6.25}Al_{0.25}La_3Zr_2O_{12}$, $Li_{6.75}La_3Zr_{1.75}Nb_{0.25}O_{12}$, and combinations thereof. The LISICON-type oxides may be selected from the group consisting of: $Li_{2+2x}Zn_{1-x}GeO_4$ (where $0<x<1$), $Li_{14}Zn(GeO_4)_4$, $Li_{3+x}(P_{1-x}Si_x)O_4$ (where $0<x<1$), $Li_{3+x}Ge_xV_{1-x}O_4$ (where $0<x<1$), and combinations thereof. The NASICON-type oxides may be defined by $LiMM'(PO_4)_3$, where M and M' are independently selected from Al, Ge, Ti, Sn, Hf, Zr, and La. For example, in certain variations, the NASICON-type oxides may be selected from the group consisting of: $Li_{1+x}Al_xGe_{2-x}(PO_4)_3$ (LAGP) (where $0 \leq x \leq 2$), $Li_{1.4}Al_{0.4}Ti_{1.6}(PO_4)_3$, $Li_{1.3}Al_{0.3}Ti_{1.7}(PO_4)_3$, $LiTi_2(PO_4)_3$, $LiGeTi(PO_4)_3$, $LiGe_2(PO_4)_3$, $LiHf_2(PO_4)_3$, and combinations thereof. The Perovskite-type ceramics may be selected from the group consisting of: $Li_{3.3}La_{0.53}TiO_3$, $LiSr_{1.65}Zr_{1.3}Ta_{1.7}O_9$, $Li_{2-y}Sr_{1-x}Ta_yZr_{1-y}O_3$ (where $x=0.75y$ and $0.60<y<0.75$), $Li_{3/8}Sr_{7/16}Nb_{3/4}Zr_{1/4}O_3$, $Li_{3x}La_{(2/3-x)}TiO_3$ (where $0<x<0.25$), and combinations thereof.

In certain variations, the metal-doped or aliovalent-substituted oxide particles may include, for example only, aluminum (Al) or niobium (Nb) doped $Li_7La_3Zr_2O_{12}$, antimony (Sb) doped $Li_7La_3Zr_2O_{12}$, gallium (Ga) doped $Li_7La_3Zr_2O_{12}$, chromium (Cr) and/or vanadium (V) substituted $LiSn_2P_3O_{12}$, aluminum (Al) substituted $Li_{1+x+y}Al_xTi_{2-x}Si_yP_{3-y}O_{12}$ (where $0<x<2$ and $0<y<3$), and combinations thereof.

In certain variations, the sulfide-based particles may include, for example only, a pseudobinary sulfide, a pseudoternary sulfide, and/or a pseudoquaternary sulfide. Example pseudobinary sulfide systems include $Li_2S—P_2S_5$ systems (such as, $Li_3PS_4$, $Li_7P_3S_{11}$, and $Li_{9.6}P_3S_{12}$), $Li_2S—SnS_2$ systems (such as, $Li_4SnS_4$), $Li_2S—SiS_2$ systems, $Li_2S—GeS_2$ systems, $Li_2S—B_2S_3$ systems, $Li_2S—Ga_2S_3$ system, $Li_2S—P_2S_3$ systems, and $Li_2S—Al_2S_3$ systems. Example pseudoternary sulfide systems include $Li_2O—Li_2S—P_2S_5$ systems, $Li_2S—P_2S_5—P_2O_5$ systems, $Li_2S—P_2S_5—GeS_2$ systems (such as, $Li_{3.25}Ge_{0.25}P_{0.75}S_4$ and $Li_{10}GeP_2S_{12}$), $Li_2S$—$P_2S_5$—LiX systems (where X is one of F, Cl, Br, and I) (such as, $Li_6PS_5Br$, $Li_6PS_5Cl$, $L_7P_2S_8I$, and $Li_4PS_4I$), $Li_2S$—$As_2S_5$—$SnS_2$ systems (such as, $Li_{3.833}Sn_{0.833}As_{0.166}S_4$), $Li_2S$—$P_2S_5$—$Al_2S_3$ systems, $Li_2S$—LiX—$SiS_2$ systems (where X is one of F, Cl, Br, and I), $0.4LiI \cdot 0.6Li_4SnS_4$, and $Li_{11}Si_2PS_{12}$. Example pseudoquaternary sulfide systems include $Li_2O$—$Li_2S$—$P_2S_5$—$P_2O_5$ systems, $Li_{9.54}Si_{1.74}P_{1.44}S_{11.7}Cl_{0.3}$, $Li_7P_{2.9}Mn_{0.1}S_{10.7}I_{0.3}$, and $Li_{10.35}[Sn_{0.27}Si_{1.08}]P_{1.65}S_{12}$.

In certain variations, the inactive oxide particles may include, for example only, $SiO_2$, $Al_2O_3$, $TiO_2$, $ZrO_2$, and combinations thereof; the nitride-based particles may include, for example only, $Li_3N$, $Li_7PN_4$, $LiSi_2N_3$, and combinations thereof; the hydride-based particles may include, for example only, $LiBH_4$, $LiBH_4$—LiX (where x=Cl, Br, or I), $LiNH_2$, $Li_2NH$, $LiBH_4$—$LiNH_2$, $Li_3AlH_6$, and combinations thereof; the halide-based particles may include, for example only, LiI, $Li_3InCl_6$, $Li_2CdC_{l4}$, $Li_2MgCl_4$, $LiCdI_4$, $Li_2ZnI_4$, $Li_3OCl$, $Li_3YCl_6$, $Li_3YBr_6$, and combinations thereof; and the borate-based particles may include, for example only, $Li_2B_4O_7$, $Li_2O$—$B_2O_3$—$P_2O_5$, and combinations thereof.

In various aspects, the first plurality of solid-state electrolyte particles 30 may include one or more electrolyte materials selected from the group consisting of: $Li_2S$—$P_2S_5$ system, $Li_2S$—$P_2S_5$-$MO_x$ system (where 1<x<7), $Li_2S$—$P_2S_5$-$MS_x$ system (where 1<x<7), $Li_{10}GeP_2S_{12}$ (LGPS), $Li_6PS_5X$ (where X is Cl, Br, or I) (lithium argyrodite), $Li_7P_2S_8I$, $Li_{10.35}Ge_{1.35}P_{1.65}S_{12}$, $Li_{3.25}Ge_{0.25}P_{0.75}S_4$ (thio-LISICON), $Li_{10}SnP_2S_{12}$, $Li_{10}SiP_2S_{12}$, $Li_{9.54}Si_{1.74}P_{1.44}S_{11.7}Cl_{0.3}$, $(1-x)P_2S_5$-$xLi_2S$ (where $0.5 \leq x \leq 0.7$), $Li_{3.4}Si_{0.4}P_{0.6}S_4$, $PLi_{10}GeP_2S_{11.7}O_{0.3}$, $Li_{9.6}P_3S_{12}$, $Li_7P_3S_{11}$, $Li_9P_3S_9O_3$, $Li_{10.35}Ge_{1.35}P_{1.63}S_{12}$, $Li_{9.81}Sn_{0.81}P_{2.19}S_{12}$, $Li_{10}(Si_{0.5}Ge_{0.5})P_2S_{12}$, $Li_{10}(Ge_{0.5}Sn_{0.5})P_2S_{12}$, $Li_{10}(Si_{0.5}Sn_{0.5})P_2S_{12}$, $Li_{3.833}Sn_{0.833}As_{0.16}S_4$, $Li_7La_3Zr_2O_{12}$, $Li_{6.2}Ga_{0.3}La_{2.95}Rb_{0.005}Zr_2O_{12}$, $Li_{6.85}La_{2.9}Ca_{0.1}Zr_{1.75}Nb_{0.25}O_{12}$, $Li_{6.25}Al_{0.25}La_3Zr_2O_{12}$, $Li_{6.75}La_3Zr_{1.75}Nb_{0.25}O_{12}$, $Li_{6.75}La_3Zr_{1.75}Nb_{0.25}O_{12}$, $Li_{2+2x}Zn_{1-x}GeO_4$ (where 0<x<1), $Li_{14}Zn(GeO_4)_4$, $Li_{3+x}(P_{1-x}Si_x)O_4$ (where 0<x<1), $Li_{3+x}Ge_xV_{1-x}O_4$ (where 0<x<1), $LiMM'(PO_4)_3$ (where M and M' are independently selected from Al, Ge, Ti, Sn, Hf, Zr, and La), $Li_{3.3}La_{0.53}TiO_3$, $LiSr_{1.65}Zr_{1.3}Ta_{1.7}O_9$, $Li_{2x-y}Sr_{1-x}Ta_yZr_{1-y}O_3$ (where x=0.75y and 0.60<y<0.75), $Li_{3/8}Sr_{7/16}Nb_{3/4}Zr_{1/4}O_3$, $Li_{3x}La_{(2/3-x)}TiO_3$ (where 0<x<0.25), aluminum (Al) or niobium (Nb) doped $Li_7La_3Zr_2O_{12}$, antimony (Sb) doped $Li_7La_3Zr_2O_{12}$, gallium (Ga) doped $Li_7La_3Zr_2O_{12}$, chromium (Cr) and/or vanadium (V) substituted $LiSn_2P_3O_{12}$, aluminum (Al) substituted $Li_{1+x+y}Al_xTi_{2-x}Si_yP_{3-y}O_{12}$ (where 0<x<2 and 0<y<3), LiI—$Li_4SnS_4$, $Li_4SnS_4$, $Li_3N$, $Li_7PN_4$, $LiSi_2N_3$, $LiBH_4$, $LiBH_4$—LiX (where x=Cl, Br, or I), $LiNH_2$, $Li_2NH$, $LiBH_4$—$LiNH_2$, $Li_3AlH_6$, LiI, $Li_3InCl_6$, $Li_2CdC_{l4}$, $Li_2MgCl_4$, $LiCdI_4$, $Li_2ZnI_4$, $Li_3OCl$, $Li_2B_4O_7$, $Li_2O$—$B_2O_3$—$P_2O_5$, and combinations thereof.

In certain variations, the first plurality of solid-state electrolyte particles 30 may include one or more electrolyte materials selected from the group consisting of: $Li_2S$—$P_2S_5$ system, $Li_2S$—$P_2S_5$-$MO_x$ system (where 1<x<7), $Li_2S$—$P_2S_5$-$MS_x$ system (where 1<x<7), $Li_{10}GeP_2S_{12}$ (LGPS), $Li_6PS_5X$ (where X is Cl, Br, or I) (lithium argyrodite), $Li_7P_2S_8I$, $Li_{10.35}Ge_{1.35}P_{1.65}S_{12}$, $Li_{3.25}Ge_{0.25}P_{0.75}S_4$ (thio-LISICON), $Li_{10}SnP_2S_{12}$, $Li_{10}SiP_2S_{12}$, $Li_{9.54}Si_{1.74}P_{1.44}S_{11.7}Cl_{0.3}$, $(1-x)P_2S_5$-$xLi_2S$ (where $0.55 \leq x \leq 0.7$), $Li_{3.4}Si_{0.4}P_{0.6}S_4$, $PLi_{10}GeP_2S_{11.7}O_{0.3}$, $Li_{9.6}P_3S_{12}$, $Li_7P_3S_{11}$, $Li_9P_3S_9O_3$, $Li_{10.35}Ge_{1.35}P_{1.63}S_{12}$, $Li_{9.81}Sn_{0.81}P_{2.19}S_{12}$, $Li_{10}(Si_{0.5}Ge_{0.5})P_2S_{12}$, $Li_{10}(Ge_{0.5}Sn_{0.5})P_2S_{12}$, $Li_{10}(Si_{0.5}Sn_{0.5})P_2S_{12}$, $Li_{3.833}Sn_{0.833}As_{0.16}S_4$, and combinations thereof.

Although not illustrated, the skilled artisan will recognize that in certain instances, one or more binder particles may be mixed with the solid-state electrolyte particles 30. For example, in certain aspects the solid-state electrolyte layer 26 may include greater than or equal to about 0 wt. % to less than or equal to about 10 wt. %, and in certain aspects, optionally greater than or equal to about 0.5 wt. % to less than or equal to about 10 wt. %, of the one or more binders. The one or more polymeric binders may include, for example only, polyvinylidene difluoride (PVDF), polytetrafluoroethylene (PTFE), ethylene propylene diene monomer (EPDM) rubber, nitrile butadiene rubber (NBR), styrene-butadiene rubber (SBR), and lithium polyacrylate (LiPAA).

The negative electrode 22 may be formed from a lithium host material that is capable of functioning as a negative terminal of a lithium-ion battery. The negative electrode 22 may be in the form of a layer having a thickness greater than or equal to about 5 μm to less than or equal to about 400 μm, and in certain aspects, optionally greater than or equal to about 10 μm to less than or equal to about 300 μm. In certain variations, the negative electrode 22 may be defined by a plurality of the negative solid-state electroactive particles 50. The negative solid-state electroactive particles 50 may have an average particle diameter greater than or equal to about 0.01 μm to less than or equal to about 50 μm, and in certain aspects, optionally greater than or equal to about 1 μm to less than or equal to about 20 μm.

In certain instances, as illustrated, the negative electrode 22 may be a composite comprising a mixture of the negative solid-state electroactive particles 50 and the second plurality of solid-state electrolyte particles 90. For example, the negative electrode 22 may include greater than or equal to about 30 wt. % to less than or equal to about 98 wt. %, and in certain aspects, optionally greater than or equal to about 50 wt. % to less than or equal to about 95 wt. %, of the negative solid-state electroactive particles 50 and greater than or equal to about 0 wt. % to less than or equal to about 50 wt. %, and in certain aspects, optionally greater than or equal to about 5 wt. % to less than or equal to about 20 wt. %, of the second plurality of solid-state electrolyte particles 90.

The second plurality of solid-state electrolyte particles 90 may be the same as or different from the first plurality of solid-state electrolyte particles 30. In certain variations, the negative solid-state electroactive particles 50 may comprise one or more carbonaceous negative electroactive materials, such as graphite, graphene, hard carbon, soft carbon, and carbon nanotubes (CNTs). In other variations, the negative solid-state electroactive particles 50 may be silicon-based comprising, for example, a silicon alloy and/or silicon-graphite mixture. In still other variations, the negative electrode 22 may include a lithium alloy or a lithium metal. In still further variations, the negative electrode 22 may comprise one or more negative electroactive materials, such as lithium titanium oxide ($Li_4Ti_5O_{12}$), metal oxides (e.g., $TiO_2$ and/or $V_2O_5$), metal sulfides (e.g., FeS), transition metals (e.g., tin (Sn)), and other lithium-accepting materials. Thus, the negative solid-state electroactive particles 50 may be selected from the group including, for example only, lithium, graphite, graphene, hard carbon, soft carbon, carbon nanotubes, silicon, silicon-containing alloys, tin-containing alloys, and any combination thereof.

In certain variations, the negative electrode 22 further includes one or more conductive additives and/or binder materials. For example, the negative solid-state electroactive particles 50 (and/or second plurality of solid-state electrolyte particles 90) may be optionally intermingled with one or more electrically conductive materials (not shown) that provide an electron conduction path and/or at least one polymeric binder material (not shown) that improves the structural integrity of the negative electrode 22.

For example, the negative solid-state electroactive particles 50 (and/or second plurality of solid-state electrolyte particles 90) may be optionally intermingled with binders, such as polyvinylidene difluoride (PVDF), poly(vinylidene fluoride-co-hexafluoropropylene) (PVDF-HFP), polytetrafluoroethylene (PTFE), sodium carboxymethyl cellulose (CMC), ethylene propylene diene monomer (EPDM) rubber, nitrile butadiene rubber (NBR), styrene-butadiene rubber (SBR), styrene ethylene butylene styrene copolymer (SEBS), polyethylene glycol (PEO), and/or lithium polyacrylate (LiPAA) binders. Electrically conductive materials may include, for example, carbon-based materials or a conductive polymer. Carbon-based materials may include, for example, particles of graphite, acetylene black (such as KETCHEN™ black or DENKA™ black), carbon fibers and nanotubes, graphene (such as graphene oxide), carbon black (such as Super P), and the like. Examples of a conductive polymer may include polyaniline, polythiophene, polyacetylene, polypyrrole, and the like. In certain aspects, mixtures of the conductive additives and/or binder materials may be used.

The negative electrode 22 may include greater than or equal to about 0 wt. % to less than or equal to about 30 wt. %, and in certain aspects, optionally greater than or equal to about 2 wt. % to less than or equal to about 10 wt. %, of the one or more electrically conductive additives; and greater than or equal to about 0 wt. % to less than or equal to about 20 wt. %, and in certain aspects, optionally greater than or equal to about 1 wt. % to less than or equal to about 10 wt. %, of the one or more binders. As will be described further below, certain aspects of the present disclosure pertain to modified binders for solid-state electrodes that alternatively form a fibrous polymeric binder network, as compared to these conventional binders and thus may be present at different levels specified below.

Alternatively, negative electrode 22 may also be a solid non-porous layer of electroactive material for example, comprising lithium or lithium alloys, such as a lithium metal electrode.

The positive electrode 24 may be formed from a lithium-based or electroactive material that can undergo lithium intercalation and deintercalation while functioning as the positive terminal of the battery 20. The positive electrode 24 may be in the form of a layer having a thickness greater than or equal to about 5 μm to less than or equal to about 400 μm, and in certain aspects, optionally greater than or equal to about 10 μm to less than or equal to about 300 μm. In certain variations, the positive electrode 24 may be defined by a plurality of the positive solid-state electroactive particles 60. The positive solid-state electroactive particles 60 may have an average particle diameter greater than or equal to about 0.01 μm to less than or equal to about 50 μm, and in certain aspects, optionally greater than or equal to about 1 μm to less than or equal to about 20 μm.

In certain instances, as illustrated, the positive electrode 24 is a composite comprising a mixture of the positive solid-state electroactive particles 60 and the third plurality of solid-state electrolyte particles 92. For example, the positive electrode 24 may include greater than or equal to about 30 wt. % to less than or equal to about 98 wt. %, and in certain aspects, optionally greater than or equal to about 50 wt. % to less than or equal to about 95 wt. %, of the positive solid-state electroactive particles 60 and greater than or equal to about 0 wt. % to less than or equal to about 50 wt. %, and in certain aspects, optionally greater than or equal to about 5 wt. % to less than or equal to about 20 wt. %, of the third plurality of solid-state electrolyte particles 92. The positive electrodes 24 may have an interparticle porosity 84 between the positive solid-state electroactive particles 60 and/or the solid-state electrolyte particles 92 that is greater than or equal to about 0 vol. % to less than or equal to about 50 vol. %, and in certain aspects, optionally greater than or equal to about 2 vol. % to less than or equal to about 20 vol. %.

The third plurality of solid-state electrolyte particles 92 may be the same as or different from the first and/or second pluralities of solid-state electrolyte particles 30, 90.

In certain variations, the positive electrode 24 may be one of a layered-oxide cathode, a spinel cathode, and a polyanion cathode. For example, in the instances of a layered-oxide cathode (e.g., rock salt layered oxides), the positive solid-state electroactive particles 60 may comprise one or more positive electroactive materials selected from $LiCoO_2$, $LiNi_xMn_yCo_{1-x-y}O_2$ (where $0 \leq x \leq 1$ and $0 \leq y \leq 1$), $LiNi_xMn_yAl_{1-x-y}O_2$ (where $0 < x \leq 1$ and $0 < y \leq 1$), $LiNi_xMn_{1-x}O_2$ (where $0 \leq x \leq 1$), and $Li_{1+x}MO_2$ (where $0 \leq x \leq 1$) for solid-state lithium-ion batteries. The spinel cathode may include one or more positive electroactive materials, such as $LiMn_2O_4$ and $LiNi_{0.5}Mn_{1.5}O_4$. The polyanion cathode may include, for example, a phosphate, such as $LiFePO_4$, $LiVPO_4$, $LiV_2(PO_4)_3$, $Li_2FePO_4F$, $Li_3Fe_3(PO_4)_4$, or $Li_3V_2(PO_4)F_3$ for lithium-ion batteries, and/or a silicate, such as $LiFeSiO_4$ for lithium-ion batteries. In this fashion, in various aspects, the positive solid-state electroactive particles 60 may comprise one or more positive electroactive materials selected from the group consisting of $LiCoO_2$, $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where $0 \leq x \leq 1$), $LiMn_2O_4$, $LiNi_xMn_{1.5}O_4$, $LiFePO_4$, $LiVPO_4$, $LiV_2(PO_4)_3$, $Li_2FePO_4F$, $Li_3Fe_3(PO_4)_4$, $Li_3V_2(PO_4)F_3$, $LiFeSiO_4$, and combinations thereof. In certain aspects, the positive solid-state electroactive particles 60 may be coated (for example, by $LiNbO_3$ and/or $Al_2O_3$) and/or the positive electroactive material may be doped (for example, by aluminum and/or magnesium).

In other variations, the positive electrode 24 include low-voltage cathode materials (e.g., <3.0 V). For example, the positive solid-state electroactive particles 60 may include lithiated metal oxides, lithium metal sulfides (e.g., $LiTiS_2$), lithium sulfide, sulfur, and the like.

In each instance, the positive electrode 24 may further include one or more conductive additives and/or binder materials. For example, the positive solid-state electroactive particles 60 (and/or third plurality of solid-state electrolyte particles 92) may be optionally intermingled with one or more electrically conductive materials (not shown) that provide an electron conduction path and/or at least one polymeric binder material (not shown) that improves the structural integrity of the positive electrode 24.

For example, the positive solid-state electroactive particles 60 (and/or third plurality of solid-state electrolyte particles 92) may be optionally intermingled with binders, like polyvinylidene difluoride (PVDF), poly(vinylidene fluoride-co-hexafluoropropylene) (PVDF-HFP), polytetrafluoroethylene (PTFE), sodium carboxymethyl cellulose (CMC), ethylene propylene diene monomer (EPDM) rubber, nitrile butadiene rubber (NBR), styrene-butadiene rubber (SBR), styrene ethylene butylene styrene copolymer (SEBS), polyethylene glycol (PEO), and/or lithium polyacrylate (LiPAA) binders. Electrically conductive materials may include, for example, carbon-based materials or a conductive polymer. Carbon-based materials may include, for example, particles of graphite, acetylene black (such as KETCHEN™ black or DENKA™ black), carbon fibers and nanotubes, graphene (such as graphene oxide), carbon black (such as Super P), and the like. Examples of a conductive polymer may include polyaniline, polythiophene, polyacetylene, polypyrrole, and the like. In certain aspects, mixtures of the conductive additives and/or binder materials may be used.

The positive electrode 24 may include greater than or equal to about 0 wt. % to less than or equal to about 30 wt. %, and in certain aspects, optionally greater than or equal to about 2 wt. % to less than or equal to about 10 wt. %, of the one or more electrically conductive additives; and greater than or equal to about 0 wt. % to less than or equal to about 20 wt. %, and in certain aspects, optionally greater than or equal to about 1 wt. % to less than or equal to about 10 wt. %, of the one or more binders. As will be described further below, certain aspects of the present disclosure pertain to modified binders for solid-state electrodes that alternatively form a fibrous polymeric binder network, as compared to these conventional binders, and thus may be present at different levels specified below.

Figure 2:
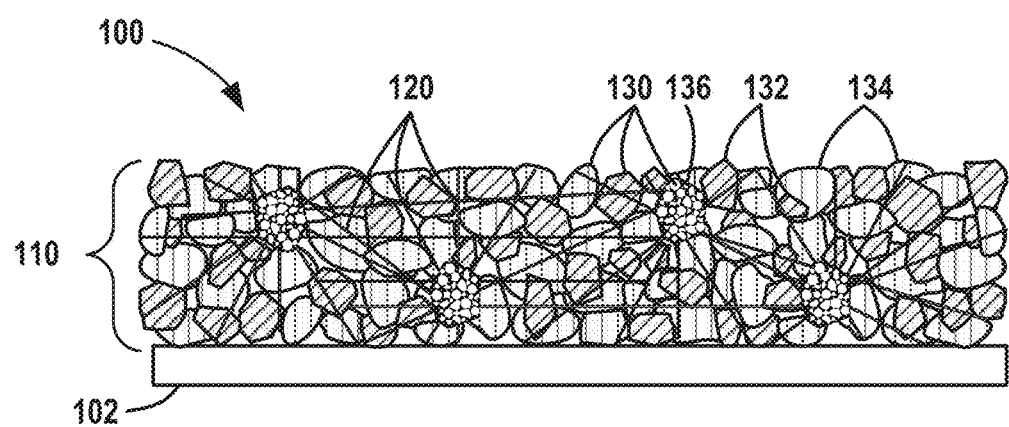
FIG. 2 shows a solid-state electrode having a porous active layer including a fibrous polymeric network having a plurality of solid particles distributed therein prepared in accordance with certain aspects of the present disclosure.

In various aspects, the present disclosure provides a solid-state electrode 100 in FIG. 2 that may be in the form of a porous composite electrode. The solid-state electrode 100 may be either a positive electrode or negative electrode, like positive electrode 24 or negative electrode 22 as described above in the context of FIG. 1. Thus, the solid-state electrode 100 comprises a current collector 102 and a porous active layer 110 disposed on the current collector 102. The current collector 102 may be a positive or negative current collector, as described above. In accordance with various aspects of the present disclosure, the porous active layer 110 comprising a fibrous polymeric network 120 having a plurality of solid particles 130 distributed therein. The fibrillated binder polymer provides a structural framework for the solid-state particles in the form of a fibrous network. For example, the fibrillated polymers define fibers that may span between, and in certain variations, connect, the solid-state particles. The fibrous polymeric network 120 comprises a fibrillated polymer that has been processed with the porous fibrillation particles 136 as a processing additive to draw out fibers of the polymeric binder that may be interwoven and create a "spider web" or entangled network of polymer fibers. This is distinct from typical binder materials that may be in the form of solid binder particles that may be further softened or melted to fill portions of interstitial spaces between respective solid particles 130.

Thus, a precursor of the polymeric binder material capable of being fibrillated to form fibers that define the fibrous polymeric network 120 may be solid polymeric binder particles capable of fibrillation when processed with porous fibrillation particle. In certain aspects, the binder includes a polymer that is configured to undergo fibrillation within a temperature range or upon being subjected to a sheer force. The binder may include polytetrafluoroethylene (PTFE), polyacrylic acid (PAA), styrene butadiene rubber (SBR), ethylene tetrafluoroethylene (ETFE), ethylene chlorotrifluoroethylene (ECTFEC), polyvinyl fluoride (PVF), perfluoroalkoxy alkanes "PFA"), fluorinated ethylene propylene (FEP), a copolymer of tetrafluoroethylene, hexafluoropropylene and vinylidene fluoride (THV), polychlorotrifluoroethylene (PCTFE), or any combinations or equivalents thereof.

In certain variations, a polymeric binder material capable of being fibrillated to form fibers that define the fibrous polymeric network 120 may comprise a polytetrafluoroethylene (PTFE). As such, the fibrillated binder/polymer may include polytetrafluoroethylene (PTFE) fiber or fibrils. In certain variations, the polytetrafluoroethylene (PTFE) has an average molecular weight measured via a weight or mass average of greater than or equal to about $10^5$ to less than or equal to about $10^9$ g/mol. As appreciated by those of skill in the art, the polymer molecular weight analysis may be measured by using gel permeation chromatography GPC, Dilute Solution or Intrinsic Viscometry (IV), and/or Melt Flow Index (MFI). In certain variations, the PTFE has a softening point of greater than or equal to about 270° C. to less than or equal to about 380° C.

In certain variations, the precursor of the polymeric binder material capable of being fibrillated to form fibers comprises solid polymeric binder particles comprising PTFE that have an average particle diameter of greater than or equal to about 100 micrometers, for example, greater than or equal to about 100 micrometers to less than or equal to about 800 micrometers, optionally greater than or equal to about 300 micrometers to less than or equal to about 700 micrometers. In this manner, when the precursor solid polymeric binder particles are processed in accordance with certain aspects of the present disclosure, the binder is fibrillated and thus forms the fibrous polymeric network 120 comprises polymer fibers that may have an average diameter of greater than or equal to about 20 nanometers to less than or equal to about 300 nanometers. The polytetrafluoroethylene (PTFE) fibrils may have an average length of greater than or equal to about 2 micrometers (μm) to less than or equal to about 100 μm.

In other variations, the fibrillated polymers may include fluorinated ethylene propylene (FEP) fibrils or fibers having an average length of greater than or equal to about 2 μm to less than or equal to about 100 μm, a softening point of greater than or equal to about 204° C. to less than or equal to about 260° C., and a molecular weight greater than or equal to about $10^5$ g/mol to less than or equal to about $10^9$ g/mol. In further variations, the fibrillated polymers may include perfluoroalkoxy alkane (PFA) fibrils or fibers having an average length of greater than or equal to about 2 μm to less than or equal to about 100 μm, a softening point of greater than or equal to about 260° C. to less than or equal to about 315° C. and a molecular weight greater than or equal to about $10^5$ g/mol to less than or equal to about $10^9$ g/mol. In still other variations, the fibrillated polymers may include ethylene tetrafluoroethylene (ETFE) fibrils or fibers having an average length of greater than or equal to about 2 μm to less than or equal to about 100 μm, a softening point of greater than or equal to about 120° C. to less than or equal to about 265° C., and a molecular weight greater than or equal to about $10^5$ g/mol to less than or equal to about $10^9$ g/mol. In still further variations, the fibrillated polymers may include a combination of polytetrafluoroethylene (PTFE) fibrils, fluorinated ethylene propylene (FEP) fibrils, perfluoroalkoxy alkane (PFA) fibrils, and/or ethylene tetrafluoroethylene (ETFE) fibrils.

In certain variations, the fibrous polymeric binder network is present in the first porous active layer at greater than or equal to about 0.01% by mass to less than or equal to about 10% by mass. For example, a weight or mass ratio of PTFE binder to the porous active layer of the composite electrode may be greater than or equal to about 0.01:100 (or 1:10,000) to less than or equal to about 20:100 (or 1:5), optionally at about 0.05:100 (or 1:2,000).

In various aspects, the fibrous polymeric network 120 has the plurality of solid particles 130 distributed therein. The plurality of solid particles 130 may comprise electroactive material particles 132, solid-state electrolyte particles 134, and processing additives in the form of porous fibrillation particles 136, as well as optional electrically conductive particles 138, such as those described previously above in the context of positive and negative electrodes in FIG. 1.

In certain variations, the solid-state electrode is a positive solid-state electrode that comprises an electroactive material particle comprising a positive electroactive material like those described above. For example, the positive electroactive material may be selected from the group consisting of: a rock salt layered oxide, a spinel, a polyanion cathode, a lithium-transition metal oxide, a lithium borate, a lithium-silicon alloying compound, lithium-tin alloying compound, lithium metal, lithium alloy, lithiated metal oxide/sulfide, lithium sulfide, sulfur, and combinations thereof. The solid-state electrode further comprises a solid-state electrolyte particle that may comprise a sulfide-based solid electrolyte like those described above. Sulfide-based electrolyte materials are typically non-flammable and in certain aspects, desirable to include in a solid-state electrode. Further, the porous active layer 110 of the solid-state electrode may further include a plurality of electrically conductive particles like those described above.

In one variation, the solid-state electrode may have a fibrous polymeric network present in the first porous active layer at greater than or equal to about 0.01% by mass to less than or equal to about 17% by mass, the porous fibrillation particles (e.g., comprising activated carbon) present in the first porous active layer at greater than or equal to about 0.01% by mass to less than or equal to about 17% by mass, the electroactive material particles present at greater than or equal to about 5% by mass to less than or equal to about 98% by mass, the solid-state electrolyte particles present in the first porous active layer at greater than or equal to about 1% by mass to less than or equal to about 70% by mass, and the electrically conductive particles are present in the first porous active layer at greater than or equal to 0% by mass to less than or equal to about 30% by mass.

The porous fibrillation particles 136 are selected to have a relatively high surface area and high porosity and thus can promote fibrillation/fiber formation when processed with the precursor of the polymeric binder capable of fibrillation. In certain variations, the porous fibrillation particles are selected from the group consisting of: activated carbon, carbon xerogel, carbon aerogel, carbon nanotube, mesoporous carbon, templated carbon, carbide-derived carbon, graphene, porous carbon spheres, heteroatom-doped carbon, metal organic framework, zeolite, and combinations thereof. In certain variations, the porous fibrillation particles comprise activated carbon particles. Activated carbon having relatively high porosity and high surface roughness provides more supporting sites for "spider web" like PTFE fibrils, which will enable formation of a continuous, more flexible electrode film.

In certain variations, the porous fibrillation particles have a high level of surface roughness, which can be expressed by having an average specific surface area of greater than or equal to about 100 $m^2/g$ (BET), as measured via "total surface area" via the Brunauer-Emmett-Teller (BET) method using nitrogen ($N_2$). Optionally an average specific surface area of the porous fibrillation particles, for example, activated carbon, may be greater than or equal to about 100 $m^2/g$, optionally greater than or equal to about 200 $m^2/g$, optionally greater than or equal to about 300 $m^2/g$, optionally greater than or equal to about 400 $m^2/g$, optionally greater than or equal to about 500 $m^2/g$, optionally greater than or equal to about 600 $m^2/g$, optionally greater than or equal to about 700 $m^2/g$, optionally greater than or equal to about 800 $m^2/g$, optionally greater than or equal to about 900 $m^2/g$, optionally greater than or equal to about 1,000 $m^2/g$, optionally greater than or equal to about 1.100 $m^2/g$, optionally greater than or equal to about 1,200 $m^2/g$, optionally greater than or equal to about 1,300 $m^2/g$, optionally greater than or equal to about 1,400 $m^2/g$, optionally greater than or equal to about 1,500 $m^2/g$, and in certain variations, optionally greater than or equal to about 1,600 $m^2/g$. It should be noted that this high surface area is contrasted with other carbonaceous material particles often included in an electrode active material, like carbon black that typically has a specific surface area of less than or equal to about 100 $m^2/g$, optionally less than or equal to about 75 $m^2/g$, and in certain variations, optionally less than or equal to about 50 $m^2/g$.

A porosity of the porous fibrillation particles, for example, activated carbon particles, may be greater than or equal to about 15% by volume to less than or equal to about 75% by volume, optionally greater than or equal to 20% by volume to less than or equal to about 70% by volume, and in certain variations, optionally greater than or equal to 25% by volume to less than or equal to about 65% by volume. In certain variations, an average pore diameter of the pores in the porous fibrillation particles may be greater than or equal to about 5 nm to less than or equal to about 1 micrometer.

An average particle size diameter of each porous fibrillation particle may be greater than or equal to about 0.5 micrometers to less than or equal to about 60 micrometers and optionally greater than or equal to about 5 nm to less than or equal to about 30 micrometers.

In certain variations, the porous fibrillation particles are present in the first porous electroactive layer of the solid-state electrode at greater than or equal to about 0.01% by mass to less than or equal to about 10% by mass. For example, a weight or mass ratio of porous fibrillation particles to the porous active layer of the composite electrode may be greater than or equal to about 0.01:100 (or 1:10,000) to less than or equal to about 20:100 (or 1:5), optionally at about 0.05:100 (or 1:2,000).

Figure 3:
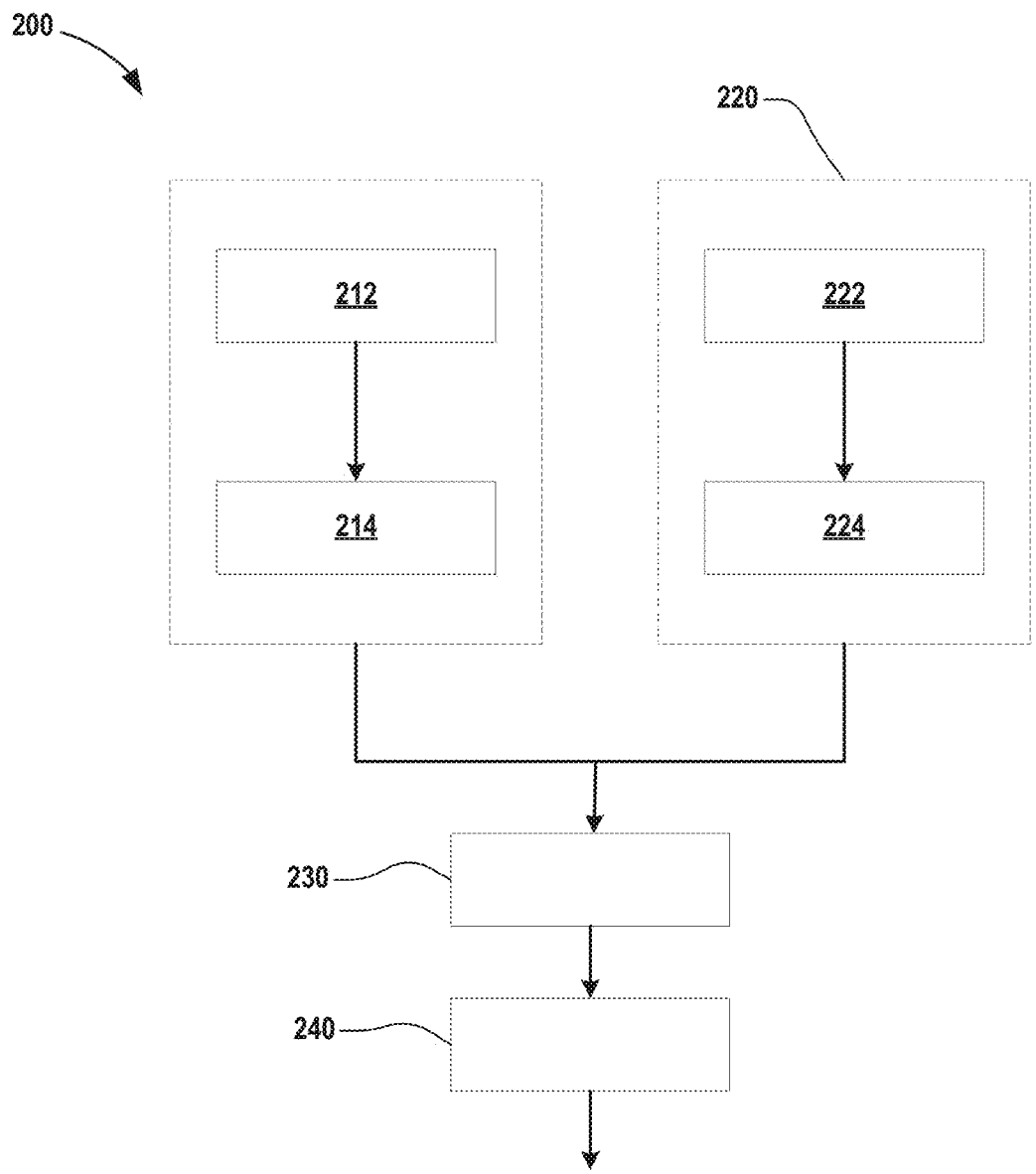
FIG. 3 shows a process flow diagram for a solvent-free method of making a solid-state electrode active layer for a solid-state electrode in an electrochemical cell that cycles lithium ions in accordance with certain aspects of the present disclosure that employs a porous fibrillation particle as a processing additive.

The present disclosure also contemplates a solvent-free method of making a solid-state electrode active layer for a solid-state electrode in an electrochemical cell that cycles lithium ions. In certain aspects, such a method 200 is shown in FIG. 3. The method 200 may comprise a first dry process 210 that may be free of any liquids or solvents. This includes introducing a polymeric binder precursor capable of fibrillation (e.g., PTFE), such as a plurality of solid polymeric binder particles, with porous fibrillation particles serving as a processing additive to induce fibrillation (e.g., activated carbon) to a mixing device at 212. Through the continuous shearing force in dry conditions, the porous fibrillation particles (e.g., activated carbon) provide sufficient supporting sites for a polymeric binder precursor (e.g., PTFE) to be fibrillated and torn into fibrils or fibers, which can effectively adhere the various solid electrode component particles and hold them together, while forming an active composite electroactive film that has enhanced electrochemical performance in terms of cycling and rate performance.

At 214, the plurality of solid polymeric binder particles and porous fibrillation particles are mixed together in the mixing device for a dry mixing process, for example, at a first shear force that to at least partially fibrillates the solid polymeric binder particles to form a polymeric binder mixture.

The polymeric binder mixture including the porous fibrillation particle processing additives and the solid polymeric binder particles may be subjected to mixing process with relatively high shear force in the mixing device, such as high shear milling to physically debundle and fibrillate the solid polymeric binder particles. The mixing and shearing can be realized by hand mill (using mortar) or other mechanical mill. A variety of commercial mixing technology is available to impose a desired shear rate on the polymeric binder mixture in the presence of the porous high surface area processing additive. These various materials can be blended or mixed by methods and equipment known in the art, such as for example, mixers (e.g., planetary, rotary), resonance dispersion, sonic and ultrasonic dispersion, centrifugal force, magnetic stirrers, kneaders, hand mixing, and the like.

The rotational speeds used to reach a given applied shear rate may vary and depend on specific mixer geometry. The various materials can be blended or mixed by methods and equipment known in the art, such as for example, mixers (e.g., planetary, rotary), resonance dispersion, sonic and ultrasonic dispersion, centrifugal force, magnetic stirrers, kneaders, hand mixing, and the like. Thus, the speed for high shear mixing may vary, but in certain variations, may be greater than or equal to about 400 rpm to less than or equal to about 10,000 rpm, optionally greater than or equal to about 400 rpm to less than or equal to about 5,000 rpm, optionally greater than or equal to about 750 rpm to less than or equal to about 5,000 rpm, optionally greater than or equal to about 1,000 rpm to less than or equal to about 5,000 rpm, optionally greater than or equal to about 1,000 rpm to less than or equal to about 3,000 rpm, for example, about 2,000 rpm. In certain variations, the mixing 214 may be optionally greater than or equal to about 400 rpm to less than or equal to about 5,000 rpm, optionally greater than or equal to about 1,000 rpm to less than or equal to about 3,000 rpm, for example, about 2,000 rpm. Notably, heat may also be applied during mixing to enhance the fiber formation process. By way of example, a temperature during mixing may be greater than or equal to about 80° C. to less than or equal to about 250° C.

The method 200 may comprise a second dry process 220 that may be free of any liquids or solvents. The second dry process 220 includes introducing electroactive material particles and solid-state electrolyte particles to a mixing device at 222. Optionally, electrically conductive particles or other solid materials may be introduced into the mixing device at 222, as well. At 224, the plurality of electroactive material particles, solid-state electrolyte particles, and optional electrically conductive particles, are mixed together in a dry mixing process, for example, at a second shear force to form a particle admixture.

At 230, the polymeric binder mixture from the first process 210 and the particle admixture from the second process 220 are mixed together (in a mixing device) and additional mixing in a dry mixing process free of liquids or solvents is conducted with a second shear force to fully fibrillate the solid polymeric binder particles to form clusters of polymer fibers with a plurality of solid particles comprising the electroactive material particles, the solid-state electrolyte particles, and the porous fibrillation particles. This mixing process may be conducted for greater than or equal to about 1 minute to less than or equal to about 120 minutes. In certain variations, this additional mixing 230 may be conducted at a speed of greater than or equal to about 400 rpm to less than or equal to about 5,000 rpm.

At 240, the clusters are then further processed to form an active material film. More specifically, the clusters may be disposed on a substrate and then consolidated, for example, by applying pressure and/or heat to the clusters. In certain variations, the substrate may be a removable substrate, while in other variations, the substrate may be a current collector.

The consolidation may be conducted by applying pressure for consolidating or densifying the plurality of clusters between a flat surface and a roller or between two rollers. The pressure applied to the plurality of clusters can thus be applied using a roll pressing method having a controlled gap. The consolidating occurs by processing (e.g., rolling) the clusters for a duration of greater than or equal to about 1 minute to less than or equal to about 360 minutes.

In certain aspects, applying the pressure to the plurality of clusters in 240 may further include applying heat while the material being processed. For example, the plurality of clusters may be heated in an environment having a temperature of less than or equal to about 100° C., for example, greater than or equal to about 40° C. to less than or equal to about 100° C., and in certain aspects, optionally greater than or equal to about 50° C. to less than or equal to about 80° C.

In this manner, at 240, the clusters are consolidated under pressure to form a film comprising a fibrous polymeric network having the plurality of the plurality of solid particles distributed therein. The fibrillated polymeric binder in each respective cluster can interact with fibrillated polymeric binder in nearby clusters to further form an interwoven fibrous polymeric network within the film. In certain aspects, the polymer fibers in the fibrous polymeric network may an average diameter of greater than or equal to about 20 nanometers to less than or equal to about 300 nanometers as described above. As noted above, in certain variations, the substrate may be a removable substrate, such as a polymeric film from which the consolidated film may be removed to form a free-standing film. Alternatively, the substrate may be a current collector and the film may be left intact to form the electrode. Thus, in certain variations, the method may further comprise disposing the free-standing film over a current collector to form the solid-state electrode active layer of the solid-state electrode. It should be noted that the current collector may be pre-treated with a coating or may have an interlayer formed thereon.

One suitable coating on the current collector may be an electrically conductive adhesive layer, which may comprise a polymer and electrically conductive filler particle. Thus, the electroactive film formed in accordance with the present disclosure can be attached to the current collector via the electrically conductive adhesive layer. The electrically conductive adhesive layer may comprise a polymer that can resist solvents and/or provides good adhesion between the current collector and electroactive film. The polymer may be selected from the group including: epoxy, polyimide (polyamic acid), polyester, vinyl ester, thermoplastic polymers, such as polyvinylidene fluoride (PVDF), polyamide, siloxane, acrylic, and combinations thereof.

The electrically conductive filler may include those materials describe above, including carbonaceous materials, like carbon black, such as Super P™, graphene, carbon nanotubes, carbon nanofibers, electrically conductive metal powder, and any combinations thereof. In certain aspects, a mass ratio of electrically conductive filler to polymer is about 0.1% to about 50%. For example, in one variation, the electrically conductive particle is a single wall carbon nanotube (SWCNT) and the polymer is a polyvinylidene fluoride (PVDF) with a SWCNT/PVDF ratio of 0.2.

The method may further include applying a pressure for consolidation or densification to the initial electroactive material layer 200, for example calendaring the initial electroactive material layer 200 between a flat surface and a roller or between two rollers, to form an intermediate or second electroactive material layer 202 having a second porosity. The second porosity is lower than the first porosity. For example, the second porosity may be greater than or equal to about 30 vol. % to less than or equal to about 65 vol. %, and in certain aspects, optionally greater than or equal to about 40 vol. % to less than or equal to about 55 vol. %, of the intermediate electroactive material layer 202.

In various aspects, the pressure applied to the clusters in the electroactive material layer may be applied using a roll pressing method having a controlled gap. In various aspects, applying the pressure to the clusters in the electroactive material layer may further include applying heat to the initial electroactive material layer. For example, the plurality of clusters may be heated to a temperature greater than or equal to about 21° C. to less than or equal to about 100° C., optionally greater than or equal to about 40° C. to less than or equal to about 80° C. and in certain aspects, optionally greater than or equal to about 50° C. to less than or equal to about 80° C.

After such a process 200, the active material film may have a thickness of greater than or equal to about 10 micrometers to less than or equal to about 1,000 micrometers.

In certain aspects, the methods may further include pretreating the solid polymeric binder precursor particles to remove water prior to introducing them into the process. For example, the method may include drying the solid polymeric binder particles to have a moisture content of less than or equal to about 500 ppm of water, optionally less than or equal to about 400 ppm, optionally less than or equal to about 300 ppm, optionally less than or equal to about 200 ppm, optionally less than or equal to about 150 ppm, and in certain variations, optionally less than or equal to about 150 ppm.

Figure 4:
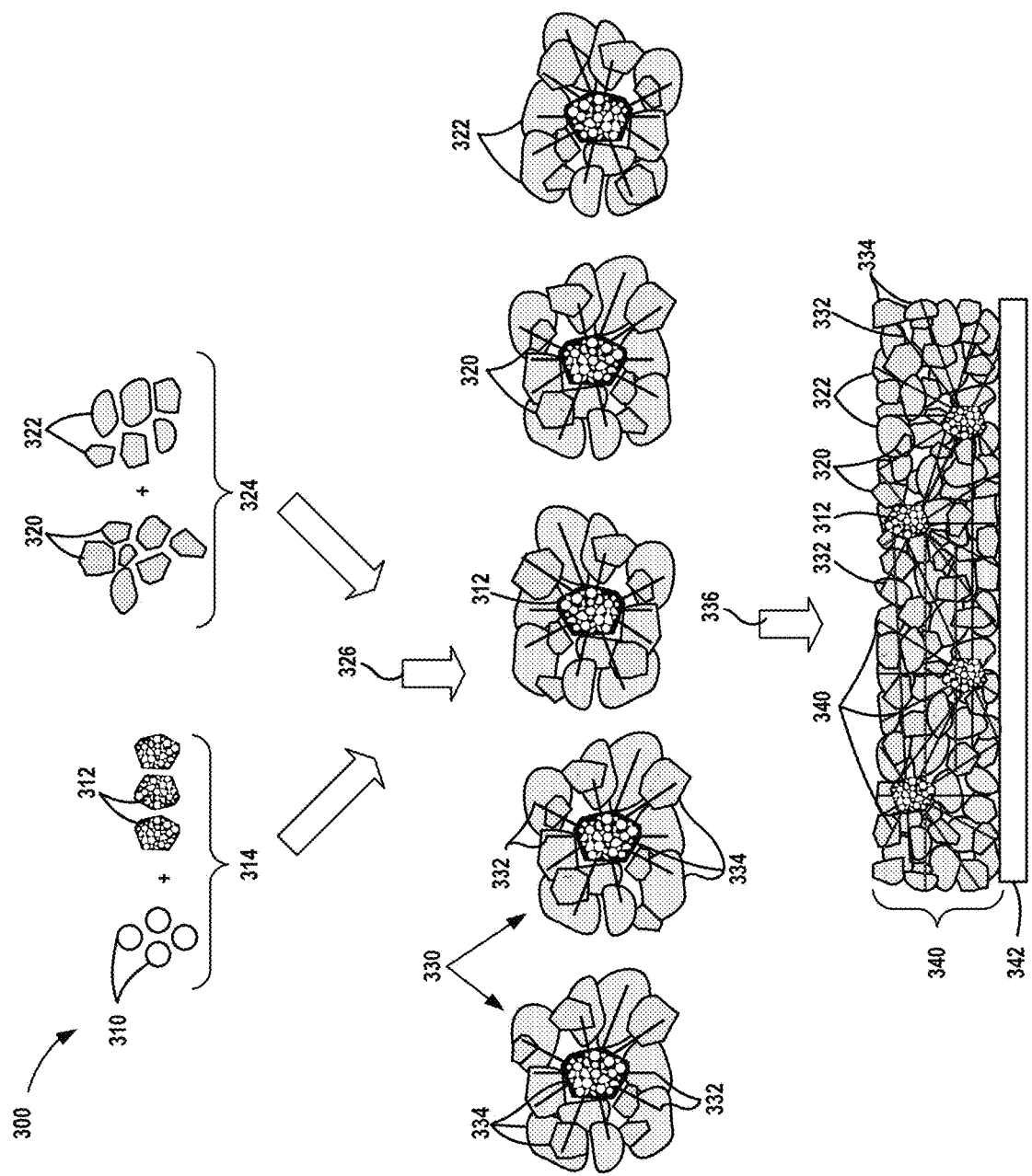
FIG. 4 schematically illustrates a solvent-free method of making a solid-state electrode active layer including a fibrous polymeric network having a plurality of solid particles distributed therein for a solid-state electrode in an electrochemical cell that cycles lithium ions in accordance with certain aspects of the present disclosure that employs a porous fibrillation particle as a processing additive.

FIG. 4 schematically illustrates a formation process 300 similar to the method 200 described above in the context of FIG. 3. First, a plurality of polymeric binder precursor particles 310 capable of fibrillation (e.g., PTFE) are mixed with porous fibrillation particles 312 serving as a processing additive to induce fibrillation (e.g., activated carbon). In this premixing process, a polymeric binder mixture 314 is formed. While not shown, the polymeric binder precursor particles 310 may be at least partially fibrillated.

Additionally a plurality of electroactive material particles 320 and plurality of solid-state electrolyte particles 322 are mixed together to form a particle admixture 324. The electroactive material particles 320 may be any of those described above and can deliver high lithium-ion capacity and build up electronic transfer. The solid-state electrolyte particles 322 may be any of those described above, such as a sulfide-based solid electrolyte that builds up favorable ion transfer within the electrode. Notably, while not shown, electrically conductive particles may also be mixed in with the electroactive material particles 320 and solid-state electrolyte particles 322 when included in the particle admixture 324.

At 326, the polymeric binder mixture 314 and the particle admixture 324 are combined together, where additional mixing can be conducted to fully fibrillate the solid polymeric binder particles into fibers 332. In this manner, a plurality of clusters 330 are formed that have the drawn polymer fibers 332 formed of polymeric binder that originated from the polymeric binder precursor particles 310 prior to fibrillation. The plurality of clusters 330 also includes a plurality of solid particles 334 comprising the electroactive material particles 320, the solid-state electrolyte particles 322, and the porous fibrillation particles 312. For example, after continuously mixing and shearing, the porous fibrillation particles 312 (e.g., activated carbon) provides a rough surface with high porosity for the polymeric binder precursor particles (e.g., PTFE) 310 to fully fibrillate, which can effectively adhere electrode material particles and hold them together like a "spider web". Thus, the activated carbon having a high surface roughness provides adhesion points for building up more fibrils in a dry-film electrode. The PTFE fibrils will interconnect the electrode composite particles to form a film.

At 336, the plurality of clusters 330 are further processed via a consolidating process. The clusters 330 may be subjected to pressure and thus form a continuous film or electroactive material layer 340 that may be disposed on a current collector 342 (either before or after consolidation). The electroactive material layer 340 comprises a continuous fibrous polymeric network 340 with interconnected polymeric fibers 332 having the plurality of the plurality of solid particles 334 distributed therein. Notably, the individual clusters 330 are joined together to form the continuous electroactive material layer 340. In this manner, the method forms a solid-state electrode active layer for a solid-state electrode in an electrochemical cell that cycles lithium ions. The solvent-free dry electrode (e.g., a positive electrode) can deliver high cycle retention and higher discharge rates (e.g., at 3 C discharge), among other advantages.

The present disclosure thus provides solvent-free methods of forming an all solid-state battery via dry processing. An all solid state lithium ion battery incorporating a sulfide solid electrolyte provides advantages of high power capability, good abuse tolerance, and a wide working temperature range, among others. The solvent-free dry film formation process desirably eliminates use of volatile organic solvents and further simplifies the electrode fabrication process by removing conventional drying steps.

Example 1

An example battery cell may be prepared in accordance with various aspects of the present disclosure. The example battery cell may include a solid-state electrode for a lithium-ion cell. For example, the example battery cell may include a first or negative electrode including a lithium-indium alloy as an electroactive material disposed on a stainless steel foil serving as the current collector. A separating interlayer comprises $Li_6PS_5Cl$ solid-state electrolyte particles is disposed on or adjacent to the negative electrode. The example battery cell may further include a second or positive electrode parallel with the negative electrode adjacent an opposite side of the separating interlayer. The positive electrode includes an aluminum foil current collector and a solid-state electrode comprising a porous electroactive layer comprising a fibrous network of PTFE with 70 wt. % electroactive material particles, 28 wt. % solid-state electrolyte particles, 1 wt. % electrically conductive particles, and 1 wt. % activated carbon fibrillation processing additive distributed therein.

A comparative battery cell is prepared that includes a negative electrode including a lithium-indium alloy as an electroactive material disposed on a stainless steel foil current collector. A separating interlayer comprises Li$_6$PS$_5$Cl solid-state electrolyte particles is disposed on or adjacent to the negative electrode. The control battery cell may further include a second or positive electrode parallel with the negative electrode adjacent an opposite side of the separating interlayer. The positive electrode includes an aluminum foil current collector with a traditional composite electrode comprising a porous electroactive layer comprising PTFE particles (without any fibrillation processing additives), 70 wt. % electroactive material particles, 29 wt. % solid-state electrolyte particles, and 1 wt. % electrically conductive particles.

Figure 5A:
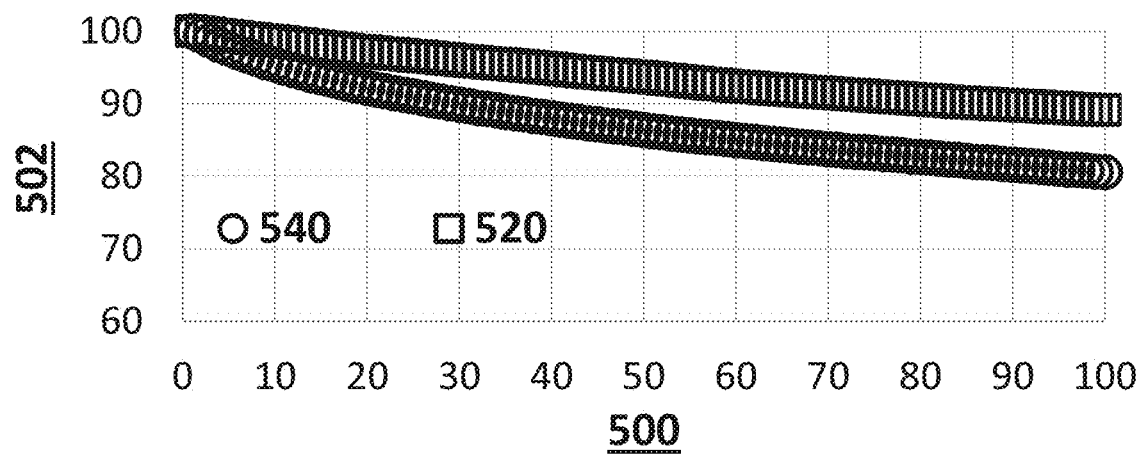
FIG. 5A is a graphical illustration demonstrating the cycle performance (capacity retention (%) versus cycle times) by comparing a battery cell having a solid-state electrode with a fibrous polymeric binder network prepared in accordance with various aspects of the present disclosure compared to a comparable control battery cell.

FIG. 5A is a graphical illustration demonstrating the cycle performance of the example battery cell 520 having a solid-state electrode with a fibrous polymeric binder network prepared with a fibrillation processing additive in accordance with various aspects of the present disclosure and a comparable control battery cell 540 having the same configuration but having only PTFE particles not processed with a fibrillation processing additive in accordance with the present teachings. The x-axis 500 represents cycle number. The y-axis 502 represents capacity retention (%). As illustrated, the example battery cell 520 has improved long-term performance at a 0.5 C discharge rate at room temperature (e.g., about 21° C.).

Figure 5B:
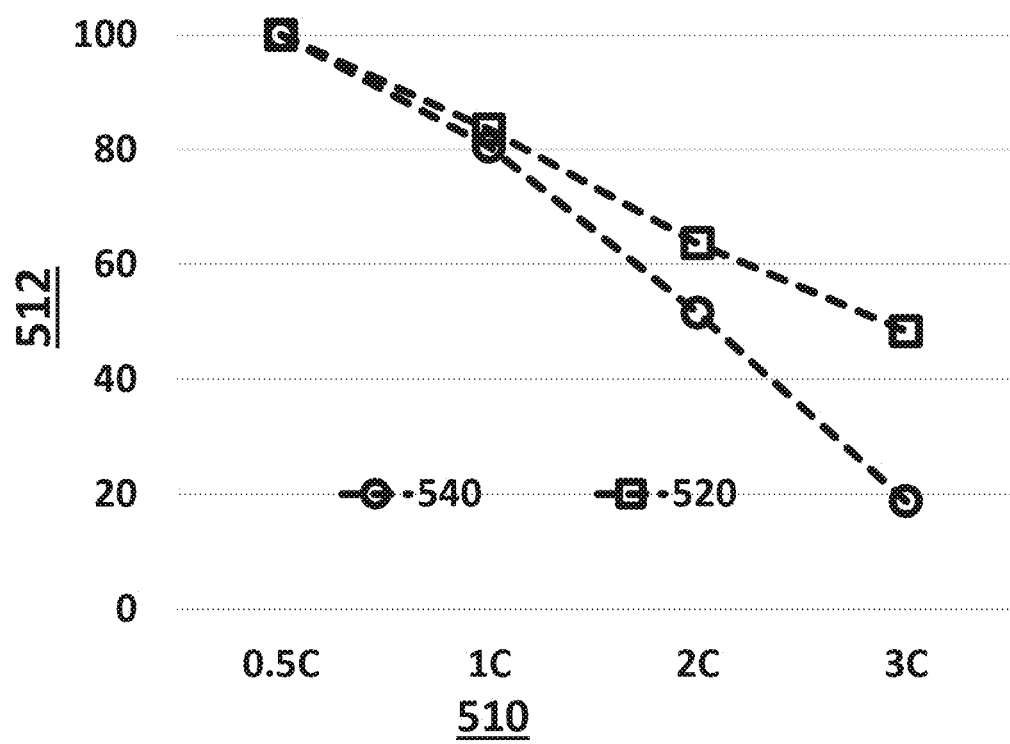
FIG. 5B is a graphical illustration demonstrating cell discharge rate (C) versus capacity retention (%) of a battery cell having a solid-state electrode with a fibrous polymeric binder network prepared in accordance with various aspects of the present disclosure compared to a comparable control battery cell.

FIG. 5B is a graphical illustration demonstrating cell discharge of the example battery cell 520 prepared with a fibrillation processing additive in accordance with various aspects of the present disclosure and a comparable control battery cell 540 at room temperature (e.g., about 21° C.). The x-axis 510 represents discharge rates (Coulombs). The y-axis 512 represents capacity retention (%). As illustrated, the example battery cell 520 has improved performance at all discharge rates, but especially at higher discharge rates, including at 2 C and 3 C.

Figure 5C:
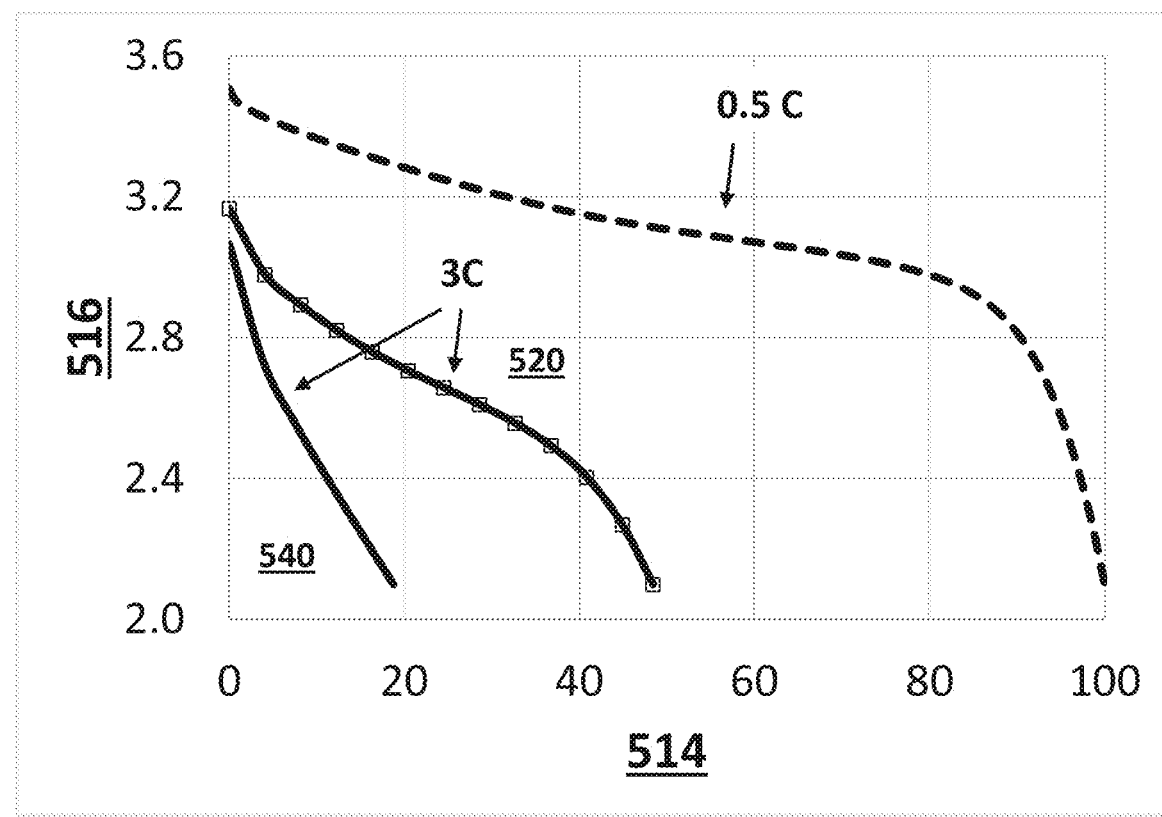
FIG. 5C is a graphical illustration demonstrating cell discharge voltage (V) versus capacity retention (%) of a battery cell having a solid-state electrode with a fibrous polymeric binder network prepared in accordance with various aspects of the present disclosure compared to a comparable control battery cell.

FIG. 5C is a graphical illustration demonstrating cell discharge of the example battery cell 520 prepared with a fibrillation processing additive in accordance with various aspects of the present disclosure and a comparable control battery cell 540 at a 3 C discharge rate. The x-axis 514 represents capacity retention (%). The y-axis 516 represents voltage (V). As illustrated, the example battery cell 520 has good capacity retention at term performance.

As shown in FIGS. 5A-5C, the solvent-free dry electrodes (e.g., a positive electrode) formed in accordance with certain aspects of the present disclosure can deliver high cycling retention, for example, at room temperature (e.g., 21° C.) and higher discharge rates (e.g., at 3 C discharge), among other advantages.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A solid-state electrode for an electrochemical cell that cycles lithium ions, the solid-state electrode comprising:
a current collector; and
a porous active layer disposed on the current collector, the porous active layer comprising a fibrous polymeric network having a plurality of solid particles distributed therein, wherein the plurality of solid particles comprises: electroactive material particles, solid-state electrolyte particles, and porous fibrillation particles, wherein the fibrous polymeric network comprises polymer fibers having an average diameter of greater than or equal to about 20 nanometers to less than or equal to about 300 nanometers, wherein the porous fibrillation particles comprise a material selected from the group consisting of: carbon xerogel, carbon aerogel, templated carbon, carbide-derived carbon, heteroatom-doped carbon, metal organic framework, zeolite, and combinations thereof.

2. The solid-state electrode of claim 1, wherein the polymer fibers comprise polytetrafluoroethylene (PTFE).

3. The solid-state electrode of claim 2, wherein the polytetrafluoroethylene (PTFE) has an average molecular weight of greater than or equal to about 10$^5$ to less than or equal to about 10$^9$ g/mol and has a softening point of greater than or equal to about 270° C. to less than or equal to about 380° C.

4. The solid-state electrode of claim 1, wherein the solid-state electrolyte particles comprise a sulfide-based solid electrolyte and the electroactive material particles comprise a positive electroactive material selected from the group consisting of: a rock salt layered oxide, a spinel, a polyanion cathode, a lithium-transition metal oxide, a lithium borate, a lithium-silicon alloying compound, lithium-tin alloying compound, lithium metal, lithium alloy, lithiated metal oxide/sulfide, lithium sulfide, sulfur, and combinations thereof.

5. The solid-state electrode of claim 1, wherein the porous fibrillation particles are first porous fibrillation particles and the plurality of solid particles further comprises second porous fibrillation particles selected from the group consisting of: activated carbon, carbon nanotube, mesoporous carbon, graphene, porous carbon spheres and combinations thereof.

6. The solid-state electrode of claim 1, wherein the porous fibrillation particles have an average specific surface area of greater than or equal to about 100 m$^2$/g, an average particle diameter of greater than or equal to about 0.5 micrometers to less than or equal to about 60 micrometers, and an average pore diameter of greater than or equal to about 5 nm to less than or equal to about 1 micrometer.

7. The solid-state electrode of claim 1, wherein the porous fibrillation particles comprise activated carbon and are present in the porous active layer at greater than or equal to about 0.01% by mass to less than or equal to about 10% by mass.

8. The solid-state electrode of claim 1, wherein the fibrous polymeric network is present in the porous active layer at greater than or equal to about 0.01% by mass to less than or equal to about 10% by mass.

9. The solid-state electrode of claim 1, further comprising a plurality of electrically conductive particles.

10. The solid-state electrode of claim 9, wherein the fibrous polymeric network is present in the porous active layer at greater than or equal to about 0.01% by mass to less than or equal to about 17% by mass, the porous fibrillation particles further comprise activated carbon and the porous fibrillation particles are present in the porous active layer at greater than or equal to about 0.01% by mass to less than or equal to about 17% by mass, the electroactive material particles are present in the porous active layer at greater than or equal to about 5% by mass to less than or equal to about 98% by mass, the solid-state electrolyte particles are present in the porous active layer at greater than or equal to about 1% by mass to less than or equal to about 70% by mass, and the electrically conductive particles are present in the porous active layer at greater than 0% by mass to less than or equal to about 30% by mass.

11. A solvent-free method of making a solid-state electrode active layer for a solid-state electrode in an electrochemical cell that cycles lithium ions, the method comprising:
 first mixing a plurality of solid polymeric binder particles capable of fibrillation with porous fibrillation particles with a first shear force to at least partially fibrillate the solid polymeric binder particles to form a polymeric binder mixture;
 admixing electroactive material particles and solid-state electrolyte particles to form a particle admixture;
 combining the polymeric binder mixture and the particle admixture together and conducting additional mixing with a second shear force to fully fibrillate the solid polymeric binder particles to form clusters of polymer fibers with a plurality of solid particles comprising the electroactive material particles, the solid-state electrolyte particles, and the porous fibrillation particles; and
 consolidating the clusters under pressure and while applying heat at a temperature greater than or equal to about 40° C. to less than or equal to about 100° C. to form a film comprising a fibrous polymeric network having the plurality of the plurality of solid particles distributed therein, wherein the fibrous polymeric network comprises the polymer fibers having an average diameter of greater than or equal to about 20 nanometers to less than or equal to about 300 nanometers.

12. The solvent-free method of claim 11, wherein the plurality of solid polymeric binder particles are pre-treated to remove water to have a moisture content of less than or equal to about 500 ppm of water.

13. The solvent-free method of claim 11, wherein the plurality of solid polymeric binder particles have an average particle diameter of greater than or equal to about 100 micrometers to less than or equal to about 800 micrometers, comprise polytetrafluoroethylene (PTFE) having an average molecular weight of greater than or equal to about $10^5$ to less than or equal to about $10^9$ g/mol and has a softening point of greater than or equal to about 270° C. to less than or equal to about 380° C.

14. The solvent-free method of claim 11, wherein the consolidating occurs by rolling the clusters for a duration of greater than or equal to about 1 minute to less than or equal to about 360 minutes.

15. The solvent-free method of claim 11, wherein the first mixing is conducted for greater than or equal to about 1 minute to less than or equal to about 120 minutes and the first mixing and the additional mixing are independently conducted at a speed of greater than or equal to about 400 rpm to less than or equal to about 5,000 rpm.

16. The solvent-free method of claim 11, wherein the film has a thickness of greater than or equal to about 10 micrometers to less than or equal to about 1,000 micrometers.

17. The solvent-free method of claim 11, wherein the film is a free-standing film and the method further comprises disposing the free-standing film over a current collector to form the solid-state electrode active layer of the solid-state electrode.

18. The solvent-free method of claim 11, wherein the porous fibrillation particles comprise activated carbon having an average specific surface area of greater than or equal to about 100 m$^2$/g, an average particle diameter of greater than or equal to about 0.5 micrometers to less than or equal to about 60 micrometers, and an average pore diameter of greater than or equal to about 5 nm to less than or equal to about 1 micrometer.

19. A solid-state electrochemical cell that cycles lithium ions, the solid-state electrochemical cell comprising:
 a first solid-state electrode comprising:
  a current collector; and
  a porous active layer disposed on the current collector, the porous active layer comprising a fibrous polymeric network having a plurality of solid particles distributed therein, wherein the plurality of solid particles comprises: electroactive material particles, solid-state electrolyte particles, and porous fibrillation particles, wherein the fibrous polymeric network comprises polymer fibers having an average diameter of greater than or equal to about 20 nanometers to less than or equal to about 300 nanometers, wherein the porous fibrillation particles comprise a material selected from the group consisting of: carbon xerogel, carbon aerogel, templated carbon, carbide-derived carbon, heteroatom-doped carbon, metal organic framework, zeolite, and combinations thereof;
 a second solid-state electrode; and
 a solid-state separating layer disposed between the first solid-state electrode and the second solid-state electrode, wherein the solid-state electrochemical cell is free of liquid electrolyte.

* * * * *